(12) United States Patent
Ben-Chorin et al.

(10) Patent No.: US 7,352,488 B2
(45) Date of Patent: Apr. 1, 2008

(54) SPECTRALLY MATCHED PRINT PROOFER

(75) Inventors: Moshe Ben-Chorin, Rehovot (IL); Ilan Ben-David, Rosh Ha'ayin (IL)

(73) Assignee: Genoa Color Technologies Ltd, Herzliya (IL)

( * ) Notice: Subject to any disclaimer, the term of this patent is extended or adjusted under 35 U.S.C. 154(b) by 1046 days.

(21) Appl. No.: 10/017,546

(22) Filed: Dec. 18, 2001

(65) Prior Publication Data

US 2002/0149546 A1    Oct. 17, 2002

Related U.S. Application Data

(60) Provisional application No. 60/306,864, filed on Jul. 23, 2001, provisional application No. 60/255,914, filed on Dec. 18, 2000.

(51) Int. Cl.
*H04N 1/60* (2006.01)
*H04N 1/46* (2006.01)
*G03F 3/08* (2006.01)
*G06K 9/00* (2006.01)

(52) U.S. Cl. .............. 358/1.9; 358/504; 358/512; 358/518; 382/162; 382/167; 345/32

(58) Field of Classification Search ............ 358/1.9, 358/504, 518, 1.15, 501, 512; 382/112, 162, 382/167; 345/207, 204, 593, 32; 348/243, 348/253

See application file for complete search history.

(56) References Cited

U.S. PATENT DOCUMENTS

| | | | |
|---|---|---|---|
| 3,699,244 A | 10/1972 | Cohen et al. | |
| 4,390,893 A | 6/1983 | Russell et al. | |
| 4,751,535 A * | 6/1988 | Myers | 347/115 |
| 4,800,375 A | 1/1989 | Silverstein et al. | |
| 4,843,381 A | 6/1989 | Baron | |
| 4,843,573 A | 6/1989 | Taylor et al. | |
| 4,892,391 A | 1/1990 | Stewart et al. | |
| 4,952,972 A | 8/1990 | Someya | |
| 4,985,853 A | 1/1991 | Taylor et al. | |
| 5,042,921 A | 8/1991 | Sato et al. | |
| 5,191,450 A | 3/1993 | Yajima et al. | |
| 5,233,385 A | 8/1993 | Sampsell | |
| 5,416,890 A | 5/1995 | Beretta | |

(Continued)

FOREIGN PATENT DOCUMENTS

EP    0 367 848    5/1990

(Continued)

OTHER PUBLICATIONS

K. Takatori et al, "Field-Sequential Smectic LCD with TFT Pixel Amplifier", SID 01 Digest, pp. 48-51.

(Continued)

*Primary Examiner*—Kimberly Williams
*Assistant Examiner*—Charlotte M. Baker
(74) *Attorney, Agent, or Firm*—Pearl Cohen Zedek Latzer, LLP

(57) ABSTRACT

A device, system and a method for soft proofing of an image before it is printed onto printed material, such that the colors of the image substantially reproduce, to the human eye, the colors as they should appear on the printed material.

12 Claims, 17 Drawing Sheets

U.S. PATENT DOCUMENTS

| | | | |
|---|---|---|---|
| 5,447,811 A | 9/1995 | Buhr et al. | |
| 5,455,600 A | 10/1995 | Friedman et al. | |
| 5,570,108 A * | 10/1996 | McLaughlin et al. | 715/823 |
| 5,592,188 A | 1/1997 | Doherty et al. | |
| 5,631,734 A | 5/1997 | Stern et al. | |
| 5,650,942 A | 7/1997 | Granger | |
| 5,657,036 A | 8/1997 | Markandey et al. | |
| 5,673,093 A | 9/1997 | Brody | |
| 5,724,062 A | 3/1998 | Hunter | |
| 5,751,385 A | 5/1998 | Heinze | |
| 5,835,099 A | 11/1998 | Marimont | |
| 5,863,125 A | 1/1999 | Doany | |
| 5,870,530 A | 2/1999 | Balasubramanian | |
| 5,872,898 A | 2/1999 | Mahy | |
| 5,892,891 A | 4/1999 | Dalal et al. | |
| 5,909,227 A | 6/1999 | Silverbrook | |
| 5,982,541 A | 11/1999 | Li et al. | |
| 5,999,153 A * | 12/1999 | Lind et al. | 345/88 |
| 6,018,237 A | 1/2000 | Havel | |
| RE36,654 E * | 4/2000 | Conner et al. | 349/6 |
| 6,058,207 A | 5/2000 | Tuijn et al. | |
| 6,069,601 A | 5/2000 | Lind et al. | |
| 6,072,464 A | 6/2000 | Ozeki | |
| 6,097,367 A | 8/2000 | Kuriwaki et al. | |
| 6,144,420 A | 11/2000 | Jung | |
| 6,147,720 A | 11/2000 | Guerinot et al. | |
| 6,157,735 A * | 12/2000 | Holub | 382/167 |
| 6,191,826 B1 | 2/2001 | Murakami et al. | |
| 6,198,512 B1 | 3/2001 | Harris | |
| 6,220,710 B1 | 4/2001 | Raj et al. | |
| 6,225,974 B1 * | 5/2001 | Marsden et al. | 345/590 |
| 6,231,190 B1 | 5/2001 | Dewald | |
| 6,236,406 B1 | 5/2001 | Li | |
| 6,246,396 B1 | 6/2001 | Gibson et al. | |
| 6,256,073 B1 | 7/2001 | Pettitt | |
| 6,259,430 B1 | 7/2001 | Riddle et al. | |
| 6,262,710 B1 | 7/2001 | Smith | |
| 6,262,744 B1 | 7/2001 | Carrein | |
| 6,278,540 B1 * | 8/2001 | Wang | 359/245 |
| 6,280,034 B1 | 8/2001 | Brennesholtz | |
| 6,304,237 B1 | 10/2001 | Karakawa | |
| 6,324,006 B1 | 11/2001 | Morgan | |
| 6,366,291 B1 | 4/2002 | Taniguchi et al. | |
| 6,404,970 B1 * | 6/2002 | Gransden et al. | 385/140 |
| 6,407,766 B1 | 6/2002 | Ramanujan et al. | |
| 6,459,425 B1 * | 10/2002 | Holub et al. | 345/207 |
| 6,467,910 B1 | 10/2002 | Sato | |
| 6,538,742 B1 | 3/2003 | Ohsawa | |
| 6,580,482 B1 | 6/2003 | Hiji et al. | |
| 6,594,387 B1 | 7/2003 | Pettitt et al. | |
| 6,633,302 B1 | 10/2003 | Ohsawa et al. | |
| 6,750,992 B1 | 6/2004 | Holub | |
| 6,757,428 B1 * | 6/2004 | Lin et al. | 382/165 |
| 6,870,523 B1 | 3/2005 | Ben-David et al. | |
| 2002/0005829 A1 | 1/2002 | Ouchi | |
| 2002/0122019 A1 | 9/2002 | Baba et al. | |
| 2002/0167528 A1 | 11/2002 | Edge | |

FOREIGN PATENT DOCUMENTS

| | | |
|---|---|---|
| EP | 0 653 879 | 5/1995 |
| JP | 60 263122 | 12/1985 |
| JP | 07043658 | 2/1995 |
| JP | 09 251160 | 9/1997 |
| JP | 10 307205 | 11/1998 |
| JP | 2000253263 | 9/2000 |
| JP | 2000338950 | 12/2000 |
| WO | WO 95/10160 | 4/1995 |
| WO | WO 97/35424 | 9/1997 |
| WO | WO 97/42770 | 11/1997 |
| WO | WO 01/95544 | 12/2001 |

OTHER PUBLICATIONS

Jeffrey A. Shimizu, "Scrolling Color LCOS for HDTV Rear Projection," SID 01 Digest, pp. 1072-1075.

Francisco H. Imai, Color Science; "Spectral reproduction from scene to hardcopy", Part 1-Multi-spectral acquisition and spectral estimation using a Trichromatic Digital Camera System associated with absorption filters.

Wyble & Berns, "A Critical Review of Spectral Models Applied to Binary Color Printing", vol. 25 No. 1.

Rosen et al, Spectral Reproduction from Scene to Hardcopy II: Image Processing. Munsell Color Science Laboratory, RIT- Proceedings of SPIE vol. 4300(2001).

Gunter Wyszecki & W.S. Stiles, Color Science; Concepts and Methods, Quantitative Data and Formulae, 2d. Ed., 1982, pp. 179-183.

Pointer, M.R., "The Gamut of Real Surface Colours", Color Research & Appl. 5(3):145-155, 1980.

Ajito et al, "Expanded Color Gamut Reproduced by Six-Primary Projection Display", Proc. SPIE, vol. 2954 (2000) pp. 130-137.

Ajito et al, "Multiprimary Color Display for Liquid Crystal Display Projectors Using Diffraction Granting", Optical Eng.38(11) 1883-1888 (Nov. 1999).

Ajito et al, "Color Conversion Method for Multiprimary Display Using Matrix Switching", Optical Review, vol. 9, No. 3 (2001), 191-197.

International Search Report for EP 01 27 1603, mailed on Nov. 24, 2005.

* cited by examiner

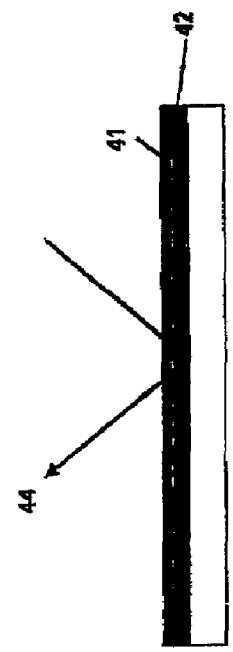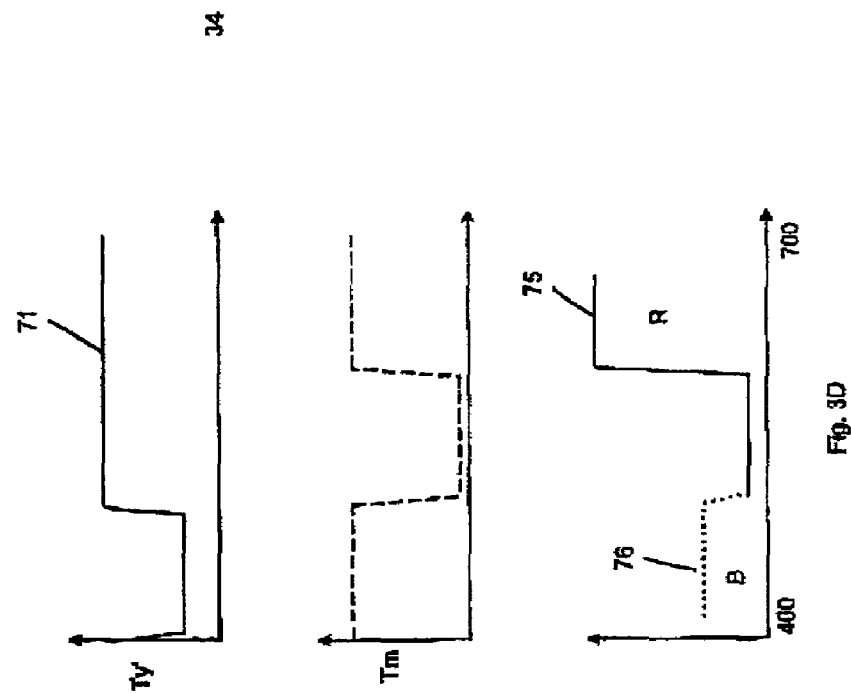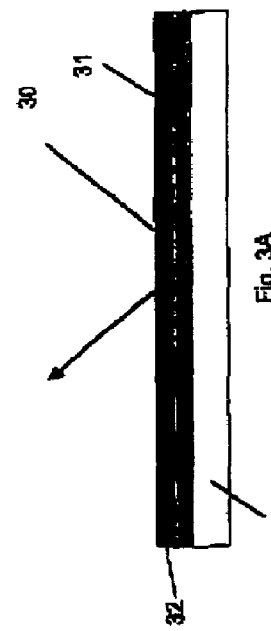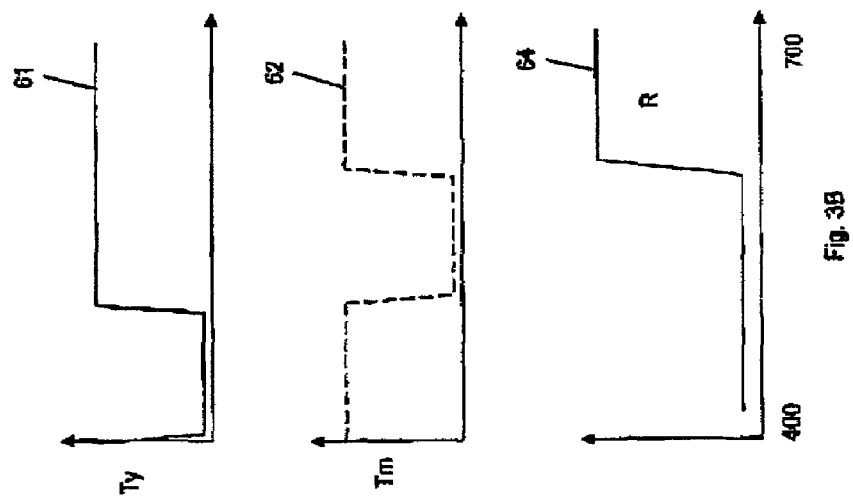

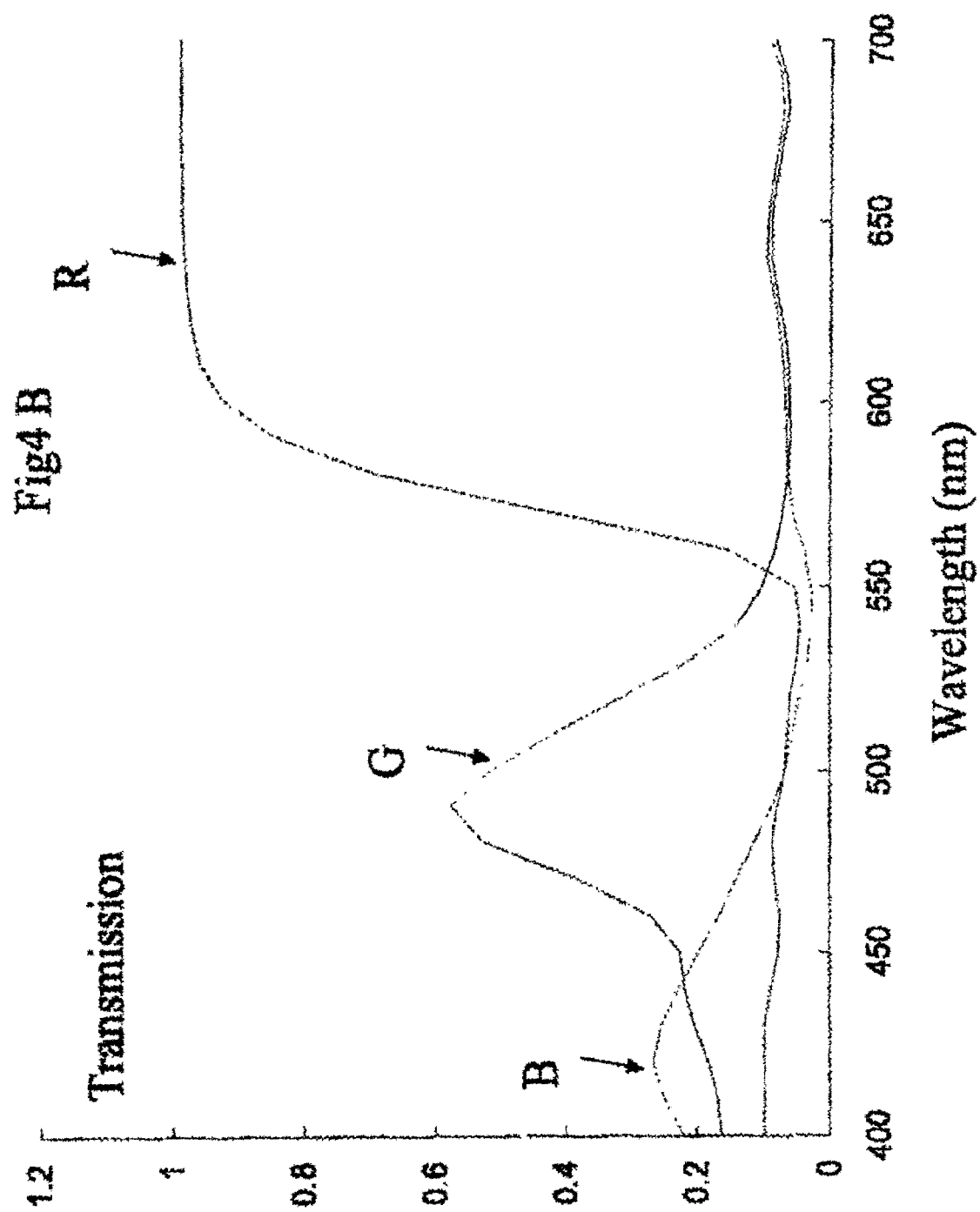

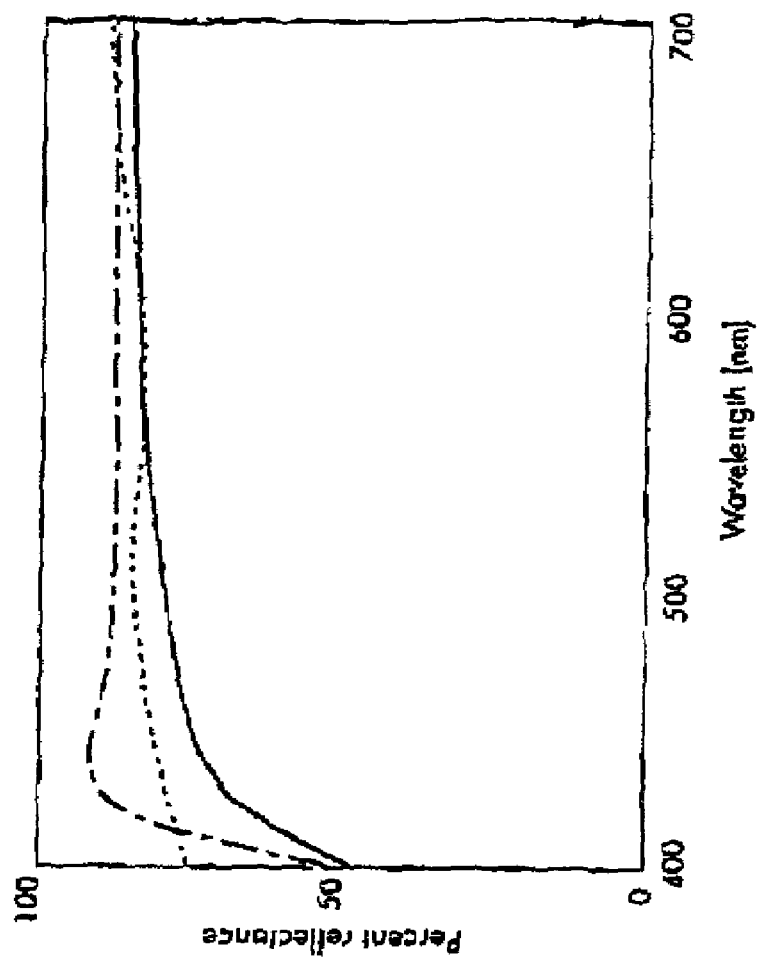
Fig. 5 : reflection spectra of typical papers

SPECTRALLY MATCHED PRINT PROOFER

PRIOR APPLICATIONS

This application claims the benefit of prior provisional application No. 60/255,914 entitled "Spectrally Matched Digital Print Proofer" filed on Dec. 18, 2000 and prior provisional application No. 60/306,864 entitled "Display for Simulation of Printed Material" filed on Jul. 23, 2001.

FIELD OF THE INVENTION

An embodiment of the present invention relates to a device, system and a method for spectrally matched digital print proofing, and in particular, to such a device, system and method in which an electronic true color display enables the displayed image to be shown with an expanded color space for more precisely matching the displayed colors to the printed colors, for example for display on a computer monitor.

BACKGROUND OF THE INVENTION

The perception of color by human vision involves the impact of light of different wavelengths in the visible spectrum (400 nm-780 nm) on the human eye, and the processing of the resultant signals by the human brain. For example, in order for a typical individual to perceive an object as "red", light in the range of wavelengths of about 580-780 nm must be reflected from the object onto the retina of the eye of the individual. Depending upon the spectral distribution of the light and assuming normal color vision, the individual perceives different colors from a wide range of such colors.

In addition, the individual perceives various characteristics of the color. The color itself is also termed the "hue". In addition, saturation determines the purity of the color, such that a color which is saturated is perceived as highly vivid, while a pastel version of the same color is less saturated. The combination of hue and saturation forms the chrominance (chromaticity) of the color. As perceived by the individual, color also has brightness, which is the apparent or perceived energy of the color, such that the color "black" is actually the absence of brightness for any color.

Although color is a complex combination of physical and physiological phenomena, it has been found that colors can be appropriately matched by combinations of only three colors, usually red, green and blue.

The following discussion considers the reproduction of color through various types of media, in particular with regard to a comparison of color reproduction through electronic display devices to color reproduction through physical printed material, such as colored inks printed onto paper, for example. The first section of the "Background" discusses color reproduction on physical printed material. The next section of the "Background" discusses such color reproduction on electronic display devices. The final section of the "Background" discusses the effect of color reproduction on electronic display devices on the process of printing colored inks onto physical printed material.

Section 1: Printed Material

Color images can be presented on substrates such as slides, films, and paper, and also on electronic displays. Color reproduction on paper involves subtractive color mixing. The term "subtractive" refers to the creation of color by removing a portion of the spectrum of light transmitted to the eye.

The nature of the color system for printed material is predicated upon the optical properties of the materials, particularly of the inks, although the paper or other material onto which the ink is placed also has an effect with regard to a color reflection characteristic, such that the material reflects light differently according to its reflection spectrum. Inks or dyes applied in printing behave as filters that pass only part of the white light spectrum. The light incident on the paper is spectrally filtered by the ink layer and reflected back towards the observer. Four types of inks are typically used, although of course other types of ink systems can also be used; Cyan (C), Magenta (M), Yellow (Y) and Black (K). The transmission spectra of "ideal" CMY ink filters are shown in FIG. 1D. Each of the primary inks blocks its complementary color, such that C passes green and blue and blocks red, M passes red and blue and blocks green and Y passes red and green and blocks blue. the black ink blocks the whole spectral range. The spectra of the complementary "ideal" RGB are shown in FIG. 1B. Thus, upon reflection from the paper surface only part of the spectrum arrives to the eye of the viewer creating the sensation of a unique color.

The intensity of the light reflected from the ink layer is measured through a filter of the complementary color. Assuming a perfect complementary filter, namely one with a 100% transmission in the relevant range and zero elsewhere, the ink layer density D, which measures its spectral blocking properties is given by:

$$D_C = -\log_{10}\left[\frac{\int_{Red} I(\lambda)d\lambda}{I_o \int_{Red} d\lambda}\right]$$

$$D_M = -\log_{10}\left[\frac{\int_{Green} I(\lambda)d\lambda}{I_o \int_{Green} d\lambda}\right]$$

$$D_Y = -\log_{10}\left[\frac{\int_{Blue} I(\lambda)d\lambda}{I_o \int_{Blue} d\lambda}\right]$$

Note that by the use of the complementary filter, the measured intensity $I(\lambda)$ gives the amount of light passing through the blocking region of the spectrum of the ink, and thus is a measure of its blocking properties. The higher the density, the more saturated is the color. For low density, the amount of light in the "blocked" region of the spectrum is high and comparable to that in the transparent area, and thus a non-saturated color is obtained.

Most printing methods are binary in nature, namely an ink layer of a certain thickness is either present or absent on the paper surface. To obtain "gray levels" for each of the inks, halftone printing is applied. The paper is divided by a virtual grid to printing dots. The area of each printing dot is partially covered with ink. The relative area covered by ink in the printing dot is known as the dot area or dot percentage (dot %). If the paper is only partially covered with ink, the apparent density is lower than the density of a solid ink layer.

For example, consider a cyan ink, which passes Blue (B) and Green (G) and blocks Red (R). The cyan solid ink density is the amount of R passing through a full coverage cyan layer. If there are small dots of cyan on paper, which are so small so that they are below the eye resolution, the paper has a pale cyan tint (a "gray level" or graduation of cyan). The apparent density of this tint is lower than that of a solid cyan layer because more red color is received by the eye, since a large amount of the red component of the light is received from the uncovered areas of the white paper. If the density of the tint area is defined in a similar manner as the way that the density of the inks are defined, there is a relationship between the tint density, the solid ink density, and the relative area of inked paper to the relative area of non-inked paper. This relation is called the Murray-Davis relation:

$$dot\ \% = \frac{1-10^{-D_t}}{1-10^{-D_s}}$$

Here $D_t$ and $D_s$ are the tint and the solid ink layer densities respectively. The Murray-Davis relation has a physical basis, but in many cases it gives inaccurate results. Yule and Nielsen suggested a similar relation to obtain the dot % from the apparent density and the solid ink density, which fits better the experimental results, but does not have a direct physical explanation. The Yule-Nielsen formula reads as:

$$dot\ \% = \frac{1-10^{-D_t/n}}{1-10^{-D_s/n}}$$

where n is an empirical value usually equal to 1.5.

The dot % is determined according to the value of the relevant pixel in the image file. Files in CMYK format, designated for printing, specify the amount of each of the primary color in 8-bit format, corresponding to 256 gray levels. A value of zero corresponds to zero coverage of the relevant ink, while a value of 255 corresponds to a full coverage of relevant ink in the printing dot.

Each of the ink is layered according to its virtual grid. When examining the printed paper at the usual viewing distance, the impression of color is achieved. However, looking at the printed paper through a magnifying glass resolves a delicate arrangement of dots in the original primary colors, and overlap regions of colors. The elementary colors, seen through the magnifying glass, include the four primaries CMYK, the three overlaps between two primaries giving Red (overlap of M and Y), Green (overlap of C and Y) and Blue (overlap of C and M), and the white color of the paper (see FIG. 1C). Overlap of CMY gives a black color, and any overlap of C, M or Y with black gives also black. Thus, the total number of elementary colors is seven, CMY RGB and white/black (white/black may be considered the same color at different brightness levels). Since the CMY RGB and white/black dots may not be not discernible to an unaided eye, the eye integrates (additively) the light reflected back from them, creating the sensation of color.

Section 2: Electronic Devices

Color is also presented by electronic means, for example by display devices such as computer monitors, televisions, computational presentation devices, electronic outdoor color displays and other such devices. These systems involve additive color mixing of three primaries: red, green and blue. The mechanism for color display may use various devices, such as Cathode Ray Tubes (CRT), Liquid Crystal Displays (LCD), plasma display devices, Light Emitting Diodes (LED) and three-color projection devices for presentations and display of video data on a large screen, for example. The term "additive" refers to the creation of color by combining light of at least two spectra before transmission to the eye. The spectra of "ideal" RGB primaries are shown in FIG. 1B, and the construction of other colors by additive mixing is shown in FIG. 1A. In practice, however, ideal primaries do not exist.

As an example of the operation of such a device, CRT displays contain pixels with three different phosphors, emitting red, green and blue light upon excitation. In currently available displays, the video signal sent to the display typically specifies the three RGB color coordinates (or some functions of these coordinates) for each of the pixels. Each coordinate represents the strength of excitation of the relevant phosphor. An individual viewing the display integrates the light coming from neighboring colored pixels to get a sensation of the required color. The process of integration is performed by a combination of the physiological activity of the eye itself and of processing of signals from the eye by the brain, without individual awareness of the process.

Although color is a complex combination of physical and physiological phenomena, it has been found that colors can be approximately matched by combinations of only three colors, usually red, green and blue, a finding which has been exploited by various types of electronic display devices. These three colors are the additive primaries. The match is perceptual, and depends on the processing of the spectrum of light arriving to the eye, by the human vision system and the brain. By combining different amounts of each color, a wide spectrum of colors can be produced. Nevertheless, not all colors can be produced by electronic display devices, since some combinations require negative values of one or more of the primaries. Although these negative values are allowed mathematically, they cannot be realized.

Therefore, these systems cannot display the full range of colors which are available to the human eye, because some colors are presented by negative values of one or more of the primaries, which cannot be realized by a physical light source. Certain background art electronic devices and systems use a fourth "color", which is actually light passed through a neutral filter, or "white light", and which is used for controlling brightness of the displayed color, as described for example with regard to U.S. Pat. No. 5,233,385. However, the use of the neutral filter does not affect the ultimate spectrum of colors can be displayed.

Section 3: Proofing of Printed Material on Electronic Devices

Reproduction of color involves the creation of an accurate apparent color match between original and reproduction. Color originals may be, for example, pictorial slides, which are analog in nature. They have a very large gamut, larger than typical reproduction means, such as offset print. In the age of digital information most of the reproduction process is done digitally. The original slide is scanned to obtain a file containing the color data in terms of RGB values. The file is converted to CMYK separations, and then plates are created, which are installed on a press for print. To obtain color consistency, proofs are performed and examined in various stages of the process, to assure that each step is color consistent with its previous step.

While in one embodiment of the system and method of the present invention, CMYK data is converted, in other embodiments other input data may be converted, having other forms or formats. Furthermore, embodiments of the system and method of the present invention may be used to proof various ink systems, such as ink systems not based on CMYK inks. For example, certain ink systems include CMYK ink plus additional numbers of inks, and other ink systems do not use the CMYK inks.

Accurate presentation of color is very important for printed matter. In order to achieve good color match, the image is currently proofed by printing a "hard proof" on paper, and sending this paper "hard proof" to the customer and/or designer for approval. Upon approval, the proof is delivered to the printing shop, where the printer working on the press machine must then adjust the press machine until the printed sheets match the hard proof.

This manual procedure limits the advantages of digital workflow. The need for an accurate digital "soft proof" on an electronic display is clear.

Currently available "soft proofing" devices enable designers and pre-press personnel to view the works on a computational device such as a personal computer or workstation displays (usually based on Cathode Ray Tubes, or CRT), while the final product is a printed image on paper. However, these background art devices do not overcome inherent deficiencies for digital print proofing, and in particular do not provide good color match, in the sense that they cannot accurately replicate the colors electronically as they would appear on the printed material. This is a serious drawback, as many printed works are now transferred digitally from design to printed material over a network, and any procedure which must be performed through printing onto physical material, before the final printing step, significantly reduces the efficiency of the printing process.

It is important to understand that RGB color displays generally cannot provide good color match to printed image for various reasons. The transition from the additive RGB color space of an electronic display to the subtractive CMYK color space of printing is rather problematic. In principle each of the subtractive primaries (except for black) should transfer two of the additive primaries and block the third one (see FIG. 1). However, in practice, this may not be the case for several reasons. First, and most important, the spectra of the RGB phosphors used in displays, and the inks used in printing are far from that of ideal primaries. Second, in a CRT, there is no overlap between the primary RGB colors, while in printed material there are regions of overlap between inks, increasing the number of elementary colors that the eye integrates.

Third, the spectra of the light passing through the CMYK inks depends on the light conditions, namely the spectrum of the white light which illuminates the paper of the printed material. Furthermore, even two printing machines may generally provide different printing results (in terms of color), since various properties of the ink and the paper play major roles in the resulting color sensation.

It is quite clear that the effects discussed above cause the color gamut of a printing press to be different from that of a display, and there are certain regions in each of the color gamuts which are not represented in the other gamut.

Even if the gamut of the print is embedded in that of the display, it is still required to provide transformation from CMYK value to RGB value in such a way that an apparent match is achieved. This is the basis of existing methods of color matching in general, and "soft proofing" on displays in particular. They are based on mapping the color space of the output device (printing press, display) into device-independent color space known as $L^*a^*b^*$, defined by CIE. Using this mapping, a multi-dimensional transformation from the RGB space of the display into the $L^*a^*b^*$ space can be performed. Then, another transformation from the $L^*a^*b^*$ space into the CMYK space of the printing press is performed. These transformations, known as profiles, are performed by a color management system on the data file containing the work, before printing. The International Color Consortium (ICC) standardized this method for color matching.

It is important to note that the above method is based on an approximate apparent match, which therefore depends on various factors including illumination conditions, and not on a full spectral match, which is always valid. The profile creation process involves many mathematical calculations and data processing, as well as good mapping of the relevant color spaces. In particular, the transformation from the three dimensional $L^*a^*b^*$ color space to the four-dimensional CMYK color space is not unique, such that extra parameters are required for its determination. The profile creation process is thus quite cumbersome, and fails to give good results in many cases. Furthermore, it requires a creation of profiles for each type of paper/ink/machine/illumination condition combination. This limits the use of the ICC workflow in the industry.

Thus, existing "soft proofers" based on software implemented mathematical transformation are only approximate, and cannot produce an accurate spectral match. In many cases, even an apparent color match is difficult to achieve. This behavior is of course unacceptable to customer, resulting in the procedure of color proofing with a "hard" proof, which is better able to simulate the subtractive and spectral nature of printed material.

A more useful solution would enable a direct spectral mapping to be performed between the color spectrum of the printed inks as they appear on the printed material and the colors of the electronic displayed image, such that these colors would be spectrally matched. Such a solution would enable the viewer to accurately determine the appearance of the image as printed on the material, such as paper, through the electronic display, such as a display device for a computer, for example. Unfortunately, such a solution is not currently available.

Therefore, there is an unmet need for, and it would be highly useful to have, a device, system and a method for accurate electronic display of an image to be printed with inks on printed material such as paper, such that the colors of the printed material have an accurate spectral match to the displayed colors on the electronic device, such as a computer monitor for example, in order to provide "soft" proofing of an image before being printed.

SUMMARY OF THE INVENTION

An embodiment of the present invention is of a device, system and a method for soft proofing of an image before it is printed onto printed material, such that the colors of the image are preferably spectrally matched to the colors as they appear on the printed material. Therefore, the electronic display of the image is preferably spectrally accurate, enabling the viewer to correctly determine the appearance of the image before it is printed.

In typical embodiments, 3, 4, 6 or 7 primaries are used. In one embodiment, the displayed image is displayed with at least seven primary colors, corresponding for example to the spectra produced by the CMYK color system for printing inks. However, in other embodiments, other numbers of primaries may be used.

Unlike background art systems which attempt to perform color transformation from CMYK to RGB color space via the device-independent $L^*a^*b^*$ color space, in such a way that an apparent color match will be achieved, an embodiment the present invention preferably does not apply transformation between color spaces. Instead, it mimics the spectrum of the light arriving to the eye of the observer from the paper, thus helping to provide a substantial or exact color match at the spectra level. Thus, the colors of the electronically displayed image can be accurately spectrally matched to the colors of the printed material.

According to an embodiment of the present invention, there is provided a device for soft proofing image data of a plural of colors for printing to form printed material, the device comprising: (a) a light source for producing light having a set of primary colors; (b) a converter for converting the image data to at least one of the set of primary colors according to at least one characteristic of the printed material to form converted data; (c) a controller for determining a combination of at least one of the set of primary colors according to the converted data for production by the light source; and (d) a viewing screen for displaying the image data according to the combination from the controller. Other numbers of primaries may be used.

According to another embodiment of the present invention, there is provided, in a device for soft proofing image data of a plurality of colors for printing to form printed material, the device comprising a light source for producing light having a set of primary colors, a converter for converting the image data to at least one of the set of primary colors according to at least one characteristic of the printed material to form converted data, and a viewing screen for displaying the image according to the converted data, the light being projected onto the viewing screen, a method for creating the image for displaying, the method comprising the steps of: (a) determining at least one characteristic of the printed material according to at least one of a spectrum of a set of inks and a color reflection characteristic of a material for receiving the at least one ink; (b) producing light by the light source including a set of primary colors; (c) determining a path for light of each primary color according to the converted data; and (d) projecting the light of each primary color according to the path onto the viewing screen to form the image.

According to still another embodiment of the present invention, there is provided a method for soft proofing image data of a plurality of colors for printing to form printed material, comprising the steps of: (a) providing a color system for printing the printed material, the color system featuring a plurality of colored materials, each colored material being subtractive, such that the colored material has a color by blocking at least a portion of a spectrum of light impinging on the colored material; (b) producing light of a set of colors for electronically displaying the image data; (c) combining light of a plurality of the colors to reproduce each color of each colored material for electronically displaying the image data, the light of the plurality of colors being combined additively to form a combination which substantially spectrally reproduces the spectrum from the printed material; and (d) displaying the image data with the combination of the light of the plurality of colors.

According to yet another embodiment of the present invention, in a device comprising a light source for producing light having a set of primary colors and a viewing screen, there is provided a method for soft proofing subtractive image data of a plurality of colors, the method comprising the steps of: (a) determining a spectrum for each of the plurality of colors of the subtractive image data; (b) matching the spectrum to spectra of a plurality of the light having a set of primary colors; (c) producing light corresponding to the spectrum through an addition of the light of a set of primary colors from the light source; and (d) displaying data on the viewing screen with the light of step (c).

Hereinafter, the term "neutral" refers to light having a spectral distribution, which does not differ substantially from that of a white light source, as obtained for example by passing light from such a white source through a neutral density filter.

Hereinafter, the term "subtractive" refers to the creation of color by removing a portion of the spectrum of light transmitted to the eye, while the term "additive" refers to the creation of color by combining light of at least two spectra before transmission to the eye.

BRIEF DESCRIPTION OF THE DRAWINGS

The invention is herein described, by way of example only, with reference to the accompanying drawings, wherein:

FIGS. 1A-1D show a comparison of ideal RGB and CMYK color spectra, in which FIG. 1A shows the behavior of the additive primaries RGB; FIG. 1B shows the spectrum of ideal RGB emitters; FIG. 1C shows the subtractive CMY filters and their overlap mixture; and the spectra of ideal subtractive CMY filters/ink is depicted in FIG. 1D;

FIGS. 3A-3D describe the imperfect trapping problem, such that in FIG. 3A white light (30) passes through a perfectly trapped layer of yellow ink (31) and a layer of magenta ink (32), incident on the paper (33), and reflected back through the same layers to give red light (34); FIG. 3B shows ideal transmission spectra of the yellow (61) and the magenta (62) inks, together with the spectrum of the red light (64) going through these layers; in FIG. 3C, non-ideal trapping is shown, in which the yellow ink layer (41) is thinner than that in the case of perfect trapping (31); in FIG. 3D the transmission spectrum of the poorly trapped yellow layer (71) and the magenta layer is shown together with the spectrum of the light (44) going through these layers, in addition to the red portion of the spectrum (75) additional blue component (76) is also present;

FIG. 5 shows reflection spectra of several typical papers for printing according to the background art.

DESCRIPTION OF THE PREFERRED EMBODIMENTS

Figure 1B:
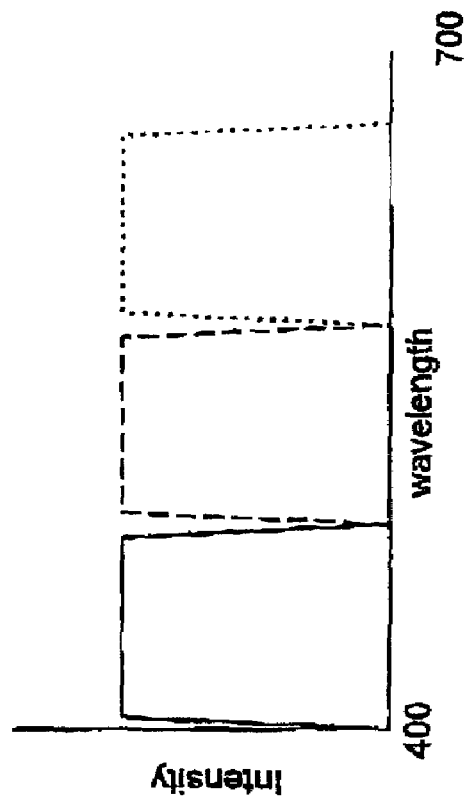
Figure 1A:
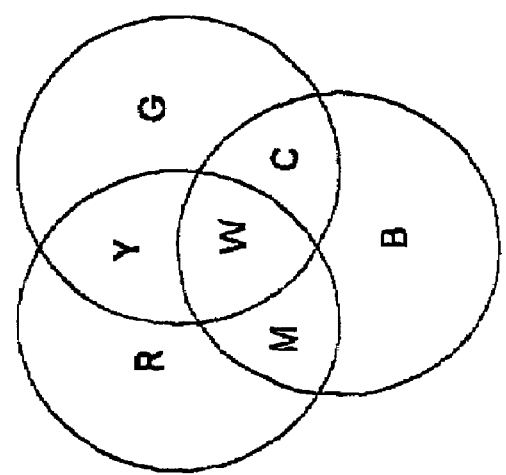
Figure 1D:
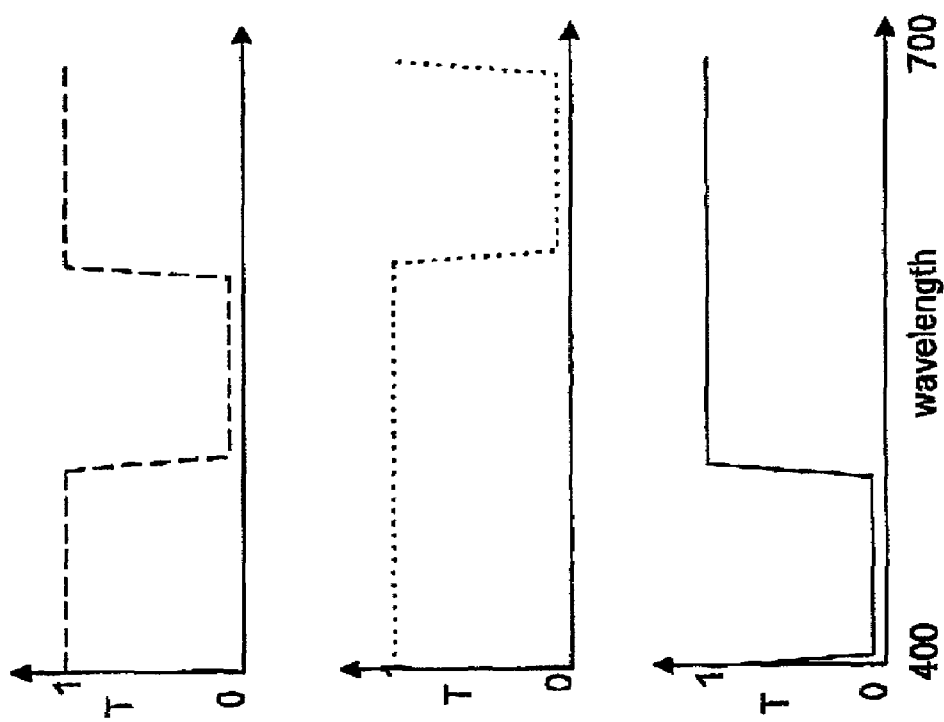
Figure 1C:
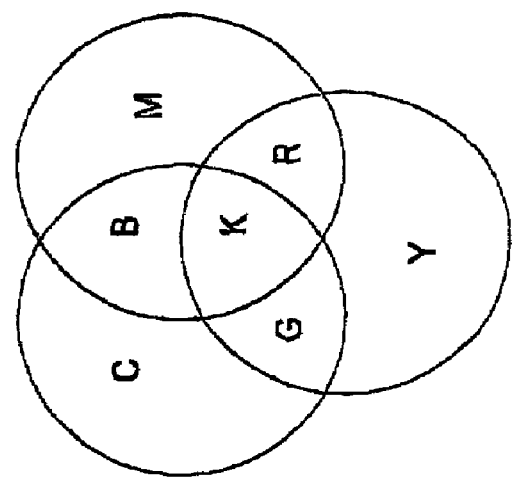

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

An embodiment of the present invention is of a device, system and a method for soft proofing of an image before it is printed onto printed material, such that the colors of the image are substantially or exactly spectrally matched to the colors as they appear on the printed material. Therefore, the electronic display of the image is spectrally accurate, enabling the viewer to correctly determine the appearance of the image before it is printed. The displayed image is displayed with at least seven primary colors, corresponding for example to the CMYK color system for printing inks. Other numbers of primaries may be used. Other ink systems may be reproduced.

Unlike background art systems which attempt to perform color transformation from CMYK to RGB color space via the device-independent L*a*b* color space, in such a way that an apparent color match is attempted, certain embodiments of the present invention do not apply transformation between color spaces. Instead, such embodiments mimic the spectrum of the light arriving to the eye of the observer from the paper, thereby providing an improved color match at the spectral level. Thus, the colors of the electronically displayed image can be accurately spectrally matched to the colors of the printed material.

Therefore, embodiments of the present invention overcome the main problem in creating a soft proofing device using an electronic display, which is the additive nature of color creation in the display, in contrast to the subtractive nature of color presentation on paper.

The following discussion describes embodiments of the present invention with regard to color reproduction through physical printed material, such as colored inks printed onto paper, for example, and "soft proofing" or display thereof through an electronic device and system according to an embodiment of the present invention. The first section discusses color reproduction on physical printed material. The next section discusses such color reproduction with electronic display devices and systems according to an embodiment of the present invention. The final section discusses specific embodiments of the present invention in reference to the Figures.

Section 1: Printed Material

An embodiment of the present invention uses a number of equations and models of light behavior, which had previously only been described and used with regard to analog color reproduction, for electronic display of image data. It should be noted that although embodiments of the present invention are described with regard to "printed material", the term should not be construed as being limited to material created from placing ink on paper, but instead encompasses all materials for which color is added to, or formed integrally with, a physical substrate, using a subtractive color system.

As previously described, the elementary colors in typical printing applications include the four primaries CMYK, the three overlaps between two primaries giving RGB, and the white color of the paper, for a total number of elementary colors of seven, CMY RGB and white/black (white/black is the same color at different brightness levels). Other printing systems may use different numbers of and combinations of inks, and embodiments of the system and method of the present invention may be used to accurately reproduce proofs for those printing systems.

Since the CMY RGB and white/black dots are not discernible to an unaided eye, the eye integrates (additively) the light reflected back from them. Thus, to obtain an accurate spectral match, the spectra of each of these seven elementary colors (or other numbers of or sets of colors) may be replicated, and their relative proportions may be kept. For each CMYK pixel value, it is straightforward to calculate the average coverage of each of the elementary colors using, for example, Demichel equations. Furthermore, the spectrum of the white light reflected from the paper surface may be replicated.

Section 2: Device, Method and System According to an Embodiment of the Present Invention A device, system and method according to an embodiment of the present invention is based on a display with a set of primaries whose spectra are able to substantially reproduce the transmission spectra produced by light passing through the inks (and their overlaps) used in a certain printing process. In one embodiment, this is achieved by substantially matching a set of primary colors to the set of transmission spectra produced by light passing through the inks and their overlaps. For example, in a CMYK ink system, seven transmission spectra are produced (the ink transmission spectra and the overlaps), and thus seven primaries may be used in the display. In one embodiment of such a display, the basic colors may be substantially white, cyan, magenta, yellow, red, green and blue. The white may be, for example, a white that is similar or identical in spectrum to the spectrum of light reflected from the intended paper or print substrate.

Other ink systems may be reproduced, having other numbers of inks. In alternate embodiments, other numbers of colors and other colors may be used in the display to reproduce the transmission spectra. For example, a set of less than seven primaries may be used to reproduce a larger set of spectra, for example the seven elementary spectra of the CMYK system. The accuracy of the print reproduction may vary based on the number and type of primaries used. In one such embodiment, six filters including spectra corresponding to, for example, transmission spectra produced by light passing through combinations of cyan, magenta, yellow, red, green and blue ink may be included, and a white spectrum may be produced by mixing light from these colors in a predefined combination. Furthermore, it is not required that each filter substantially reproduce a spectrum produced by the light passing through inks (and overlaps). Each spectrum produced by the inks may be substantially reproduced by a positive linear combination of the primary or filter spectra.

While, typically, the inks are printed onto paper, other substrates may be used. Embodiments of the system and method of the present invention may reproduce material printed on any sort of printing substrate.

A good spectral match may be produced by numbers of primaries less than six; for example three or four display primaries may be used to reproduce spectrally the spectrum of the inks and overlaps. Furthermore, regardless of the number of primaries, the primaries included need not individually match the spectra reproduced. A set of primaries may spectrally reproduce a set of spectra. For example, a set of seven primaries may be used to spectrally reproduce a set of seven spectra. Furthermore, a set of less than seven primaries (e.g., three, four, five or six) may be used to spectrally reproduce a set of seven elementary spectra of the inks.

The display preferably reproduces image data according to a number of characteristics of the printed material, lighting, or other aspects of the printing process. Such characteristics may include, for example, the transmission spectra produced by light passing through the inks, or other qualities of the inks, the reflectance or other qualities of the paper or printing substrate, and the various qualities (such as the spectrum or intensity) of the light used to view the printed material. The display may operate according to other characteristics of the print and viewing process.

The white light spectrum may be adjusted to fit the spectrum of the light, reflected from the paper of the printed material, under the relevant illumination conditions. For example, a filter or set of filters including correcting for several different spectra (e.g., D50, D65, halogen, etc.) may be included. A filter wheel or filter bar with such filters may be included, and a user may adjust which filter, if any, may affect the illumination. In alternate embodiments, the white light spectrum need not be adjusted, or may be adjusted in different manners; furthermore, spectra other than white may undergo adjustment.

A system and device for an embodiment of the present invention can optionally be implemented as follows. The electronic display device is preferably able to display light of at least seven colors, although other numbers of colors may be used. The device operates with a light source capable of transmitting light of preferably at least seven colors, preferably with a projective light mechanism for projecting the light onto display screen. The device includes a component for controlling the color of light which is displayed on each portion of the display screen, and thereby modulating the colors of the display.

In alternate embodiments of the system and method of the present invention, primary colors may be produced by other methods, such as LCDs or LEDs.

Section 3: Preferred Embodiments of the Present Invention

The principles and operation of the device, system and method according to embodiments of the present invention may be better understood with reference to the drawings and the accompanying description.

Figure 2A:
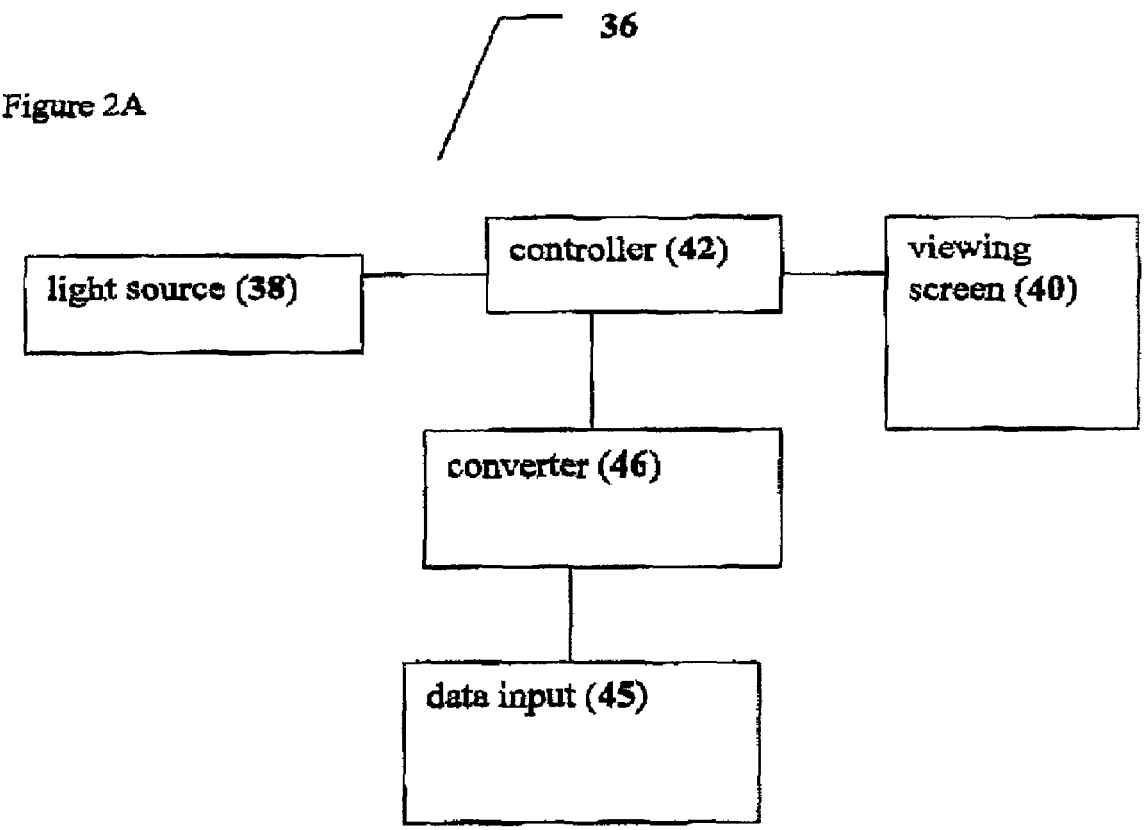
FIGS. 2A and 2B are schematic block diagrams of embodiments of an exemplary display device and system according to an embodiment of the present invention.
Figure 2B:
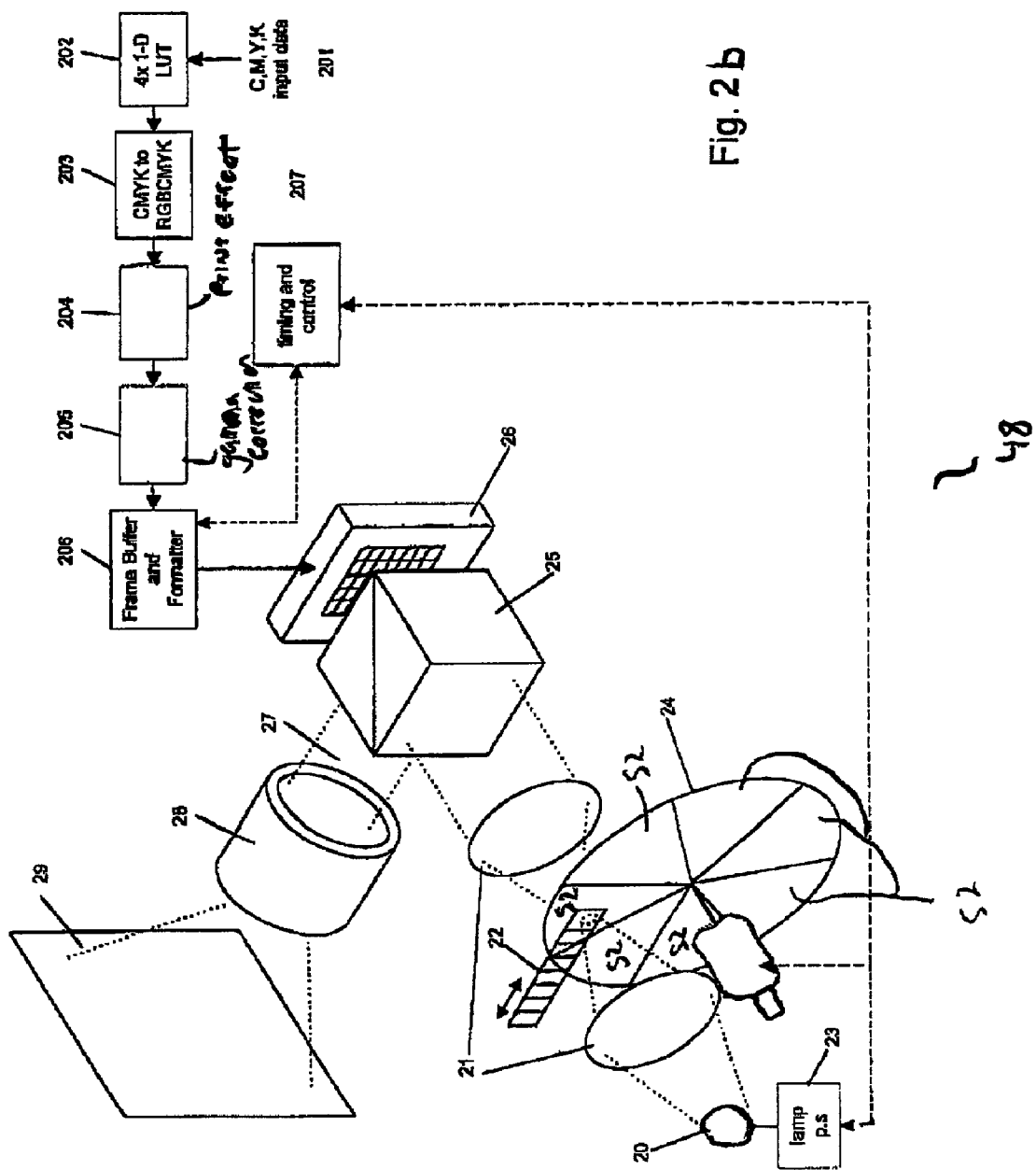

Referring now to the drawings, FIGS. 2A and 2B are schematic block diagrams of embodiments of an exemplary display device and system for electronic soft proofing according to an embodiment of the present invention. FIG. 2A shows a basic embodiment of the exemplary display device and system, while FIG. 2B shows an embodiment featuring a light projection mechanism.

As shown in FIG. 2A, a system 36 according to one embodiment features a light source 38 for producing light of preferably seven elementary colors. In one embodiment, these colors are C, M, Y, R, G, B and white, fitted in transmission spectrum to that of a certain set of inks and paper under certain illumination conditions. In one embodiment, one filter or primary source is used for each primary; in alternate embodiments lower numbers of primaries may be mixed in the proper proportions to reproduce with some accuracy a higher number of transmission spectra colors. The light from light source 38 is displayed on a viewing screen 40, thereby enabling the human viewer to see the colors of the displayed image (not shown). Preferably, the light from light source 38 is projected onto viewing screen 40. In order for each color to be properly displayed in the correct location of the displayed image, a controller 42 controls the production of light of each color, such that the correct light is shown at the correct location of viewing screen 40. Controller 42 may be separate from light source 38, such that these two components are not combined into a single component. In alternate embodiments the two components may be provided in the same device.

In alternate embodiments of the system and method of the present invention, primary colors may be produced by other methods, such as LCDs or LEDs.

Various physical print systems may be used to convert print data such as digital CMYK print data to printed material. For example, data may be converted by printers using silk screen methods, lithography, ink jet methods, or other methods. Each method may result in a different appearance for identical input data. The system and method of the present invention may simulate various print methods. In one embodiment the same display may be used to simulate different printing methods. A user selectable setting may control various aspects of the display, such as filter sets or software or hardware controls (such as data conversion or spectral correction or combination methods) to allow different print processes to be simulated.

In one embodiment of system 36, light source 38 projects light of at least seven colors, without being able to control the location of the projected light onto viewing screen 40. Controller 42 then determines the relative location of light of each color as projected onto viewing screen 40, for example with a spatial light modulator and/or another system of mirrors and/or lenses.

In order for controller 42 to be able to determine the correct light for being displayed at each portion of viewing screen 40, controller 42 optionally receives data from a data input 45, which may optionally be digital or analog. Most preferably, controller 42 also receives instructions and/or commands from a converter 46, which lies between data input 45 and controller 42. Converter 46 converts the data from data input 45 into a format which is suitable for controller 42, and also includes any necessary instructions and/or commands for enabling controller 42 to be able to understand the data. Converter 46 may be implemented in software, hardware, or a combination thereof. Optionally, converter 46 may also convert the data from an analog signal to digital data, such that controller 42 is only required to receive digital data. Preferably, converter 46 is able to determine the appropriate combination of light of at least seven different colors in order to accurately represent the color image data with displayed colors which spectrally match or substantially spectrally match the colors of a certain printed material, such that the appearance of the displayed image matches or substantially matches the appearance of a certain set of inks as printed onto the paper of the printed material.

In alternate embodiments, converter 46 is able to determine the appropriate combination of light of another number of primary colors in order to accurately represent a set of ink transmission spectra. For example, three or four primaries may be combined to reproduce seven transmission spectra. In other embodiments, other numbers of transmission spectra may be reproduced, for example if proofing for ink systems producing different numbers of transmission spectra are desired to be created.

FIG. 2B shows an embodiment of an exemplary display device according to an embodiment of the present invention, which is based on a sequential light projection system, similar in certain respects to that suggested in U.S. Pat. No. 5,592,188, which is hereby incorporated by reference as if fully set forth herein. Embodiments of the present invention use a set of primaries whose spectra are able to substantially reproduce the transmission spectra produced by light passing through the inks (and their overlaps) used in a certain printing process. One embodiment uses primary colors of spectra similar to the transmission spectra of light passing through printing inks (and overlaps) to accurately display the image which is to be printed onto "hard copy" printed material, such as paper for example. Other embodiments may use combinations of primaries to produce such transmission spectra.

A system 48 according to one embodiment is based on passing white or substantially white light from a source 20 through a spectrum-correcting filter 22 in order to attempt to match the spectrum of the light to at least one of, and more preferably both of, the relevant required illumination conditions and the relevant paper (or other printing substrate) reflectance spectrum. Spectrum-correcting filter 22 optionally and preferably includes two tonal components: a first functional component for correcting the spectrum of light with regard to the required illumination conditions and a second functional component for correcting the spectrum of light with regard to the relevant printing substrate reflectance spectrum. These two functional components are optionally implemented as two separate parts of spectrum-correcting filter 22, but alternatively may be implemented in a single physical device.

Such correction filters may be implemented in various manners. For example, a filter or set of filters including correcting for several different spectra may be included. A filter wheel or filter bar with such filters may be included, and a user may adjust which filter, if any, may provide correction. In one embodiment, the printing substrate correction filter is a continuously variable filter and the illumination correction filter includes discrete filters. In other embodiments, no such correction is needed, and other types and combinations of correction or adjustment may be used.

The brightness of the light is optionally and preferably controlled by adjusting the amount of power supplied by a power supply 23 or by a variable neutral density filter. The spectrally-corrected light passes through appropriate color filters 52 to form colored light of a defined spectral range. As previously described, system 48 preferably uses at least seven such colored filters 52 (six colors+white), which as shown may optionally be configured in a color filter wheel 24, but may optionally include other numbers of filters or primaries.

In further embodiments, primaries are reproduced using methods other than filters; for example, different LEDs may provide primaries.

In order for the light to be directed through the appropriate filter 52, preferably the light is focused by a condenser lens 21, optionally implemented as two such lenses 21 for the purposes of illustration only and without any intention of being limiting. In alternate embodiments, various components, such as the condenser, may be eliminated. The focused light is then directed through one of the filters on filter wheel 24, which holds the color filters 52. In this example, the combination of light source 20, spectrum-correcting filter 22 and color filters 52 can be considered to form at least part of the light source of FIG. 2A above, optionally with other components involved in the production of the light itself.

Preferably, the colored light illuminates a spatially modulated mask 26, also known as an SLM (spatial light modulator) which determines the particular color for being displayed at each portion of the image (typically according to each pixel), by determining whether light of that color is permitted to pass for illuminating that pixel. For example, a digital micro-mirror device (DMD) by Texas Instruments or Ferroelectric Liquid Crystal (FLC) SLM by MicroPix, Displaytech and other vendors may be used.

The colored light for this image is then projected by a projection lens 28 onto a viewing screen 29. Viewing screen 29 displays the resultant colored image to the user (not shown). Spatially modulated mask 26, and preferably the combination of spatially modulated mask 26 and projection lens 28, can be considered to be an example of the controller from FIG. 2A. In alternate embodiments other controllers and methods for controlling the system may be used.

One embodiment includes two projector systems, each including appropriate equipment such as a light, any appropriate correction filters, a color wheel, an SLM or other modulating or pixilating device, and any other required equipment. Each color wheel may include, for example, three or four primaries out of the six or seven used with the overall system. If data conversion (e.g., conversion from CMYK data) is performed, each projector accepts data from a data converter or, alternately, accepts input data and performs data conversion for the relevant primaries contained within the projector. The projectors are synchronized and project light onto the same viewing screen. More than two projectors may be used, and each projector may include other numbers of primaries. Such an arrangement allows for commercially available systems to be used with less modification.

Preferably, a motor 63 rotates filter wheel 24 in front of light source 20, so in each turn spatially modulated mask 26 is illuminated by the colors in filter wheel 24 sequentially. Preferably, the rate of rotation is at the frame frequency, which is the frequency at which the full-color image on viewing screen 29 is refreshed.

Preferably, the loading of the data into spatially modulated mask 26 is synchronized by a timing system 207, according to the rotation of filter wheel 24. The light beam is spatially modulated by spatially modulated mask 26, so that the apparent brightness of each primary color varies at different portions of viewing screen 29, typically according to each pixel of the image. Each position 68 on viewing screen 29 is preferably associated with a certain pixel 70 in spatially modulated mask 26. The brightness of that position is determined by the relevant data pixel in the image. The values for the pixels of the image are optionally and preferably retrieved from an image data file 201. The human viewer integrates the sequential stream of the primary images to obtain a color image which spectrally matches or substantially spectrally matches the image on paper. In further embodiments, other methods of producing primaries and displaying primaries may be used, and other light delivery mechanisms using different sets of components may be used. For example, an SLM need not be used.

Exemplary but preferred implementations of various components of the above projection display system are now given in greater detail. Spectrum-correcting filter 22 may correct for at least one of, and preferably both of, the required illumination conditions and the relevant paper or printing substrate reflectance spectrum. One standard illumination in the printing industry is D50 illuminant (D65 in US; both are daylight illumination, from a black body at 5000K and 6500K respectively through the atmosphere), but other illuminants, such as illuminant A (tungsten lamp, typical for indoor illumination) and 9300 K illumination (typical for light outdoors, under a blue sky without direct sunlight) are also common. The lamp itself has a spectrum, which is typically, but which may not be, very different from these illuminants (and depends on the type of the lamp, e.g tungsten, halogen, metal-halide, Xenon and others). Therefore, the spectrum of the omitted light may be corrected.

The illumination correction is preferably obtained by placing spectrum-correcting filter 22 with a transmission spectrum $T_f(\lambda)$ after light source 20. The filter spectrum is given by $T_f(\lambda)?S_i(\lambda)/S_L(\lambda)$, where $S_L(\lambda)$ and $S_i(\lambda)$ are light source 20 and the required illuminant spectra respectively. The light passing through spectrum correcting filter 22 has a spectrum preferably identical or substantially identical to that of the required illuminant. These types of filters are based on color temperature conversion filters in combination with narrow notch filters, which are applied if the lamp spectrum contains narrow spectral lines, which may be rejected. The design of such filters is known in the art.

Figure 9A:
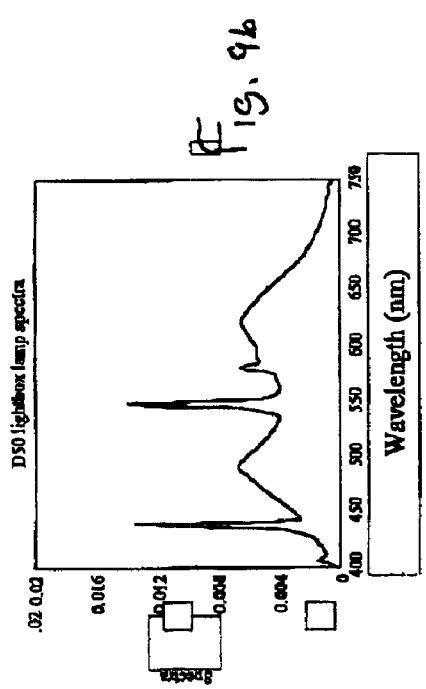
FIG. 9a depicts the spectra of a lamp currently marketed as the Osram™ VIP lamp.
Figure 9B:
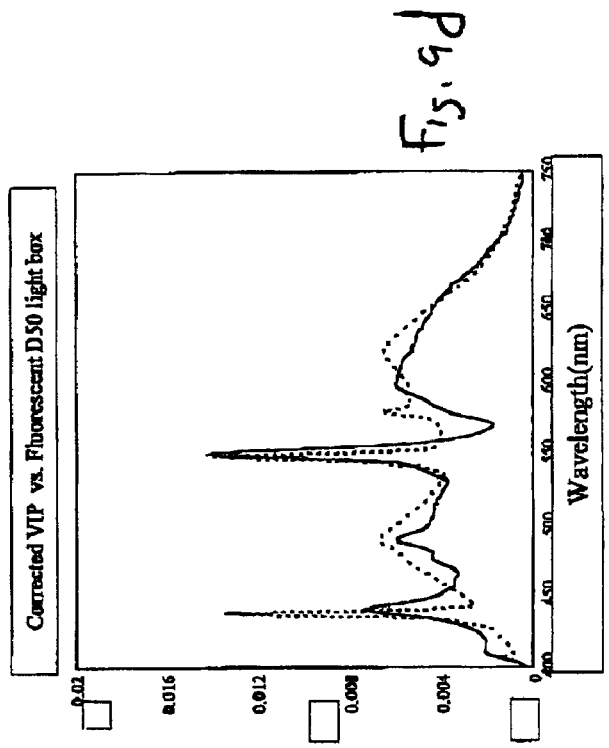
FIG. 9b depicts the spectra of a D50 equivalent fluorescent lamp.
Figure 9C:
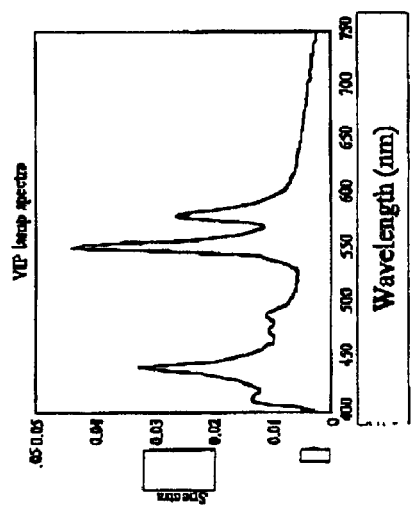
FIG. 9c depicts a spectrum of a correction filter according to an embodiment of the present invention.
Figure 9D:
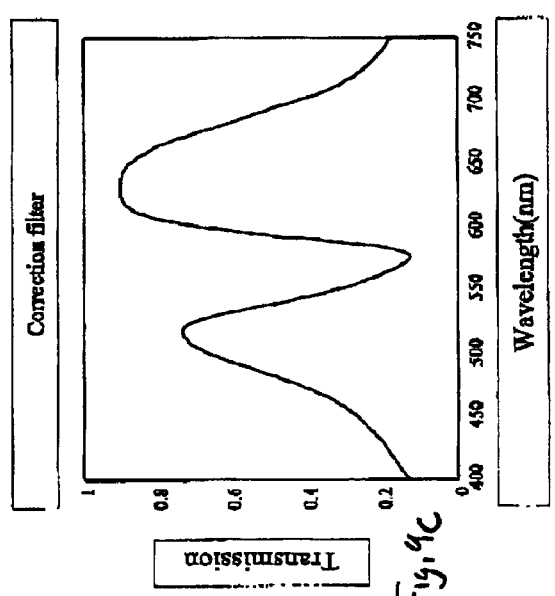
FIG. 9d is a spectrum created using a correction filter, according to an embodiment of the present invention.

FIGS. 9a-9d depict spectra of various white lights, a correction filter, and the spectrum resulting from the use of the correction filter, according to an embodiment of the present invention. FIG. 9a depicts the spectra of a lamp currently marketed as the Osram™ VIP lamp. FIG. 9b depicts the spectra of a D50 equivalent fluorescent lamp. A correction filter having a spectrum as shown in FIG. 9c may be applied to the spectrum of FIG. 9a to produce the spectrum of the solid line in FIG. 9d, which substantially matches the spectrum of FIG. 9b. Both spectra have substantially the same color temperature and a high color rendering index. In alternate embodiments, other correction spectra may be applied.

Although the color of paper or printing substrate for which reproduction is intended is generally white, it might have tint. Papers are typically yellowish or bluish. The tint of the paper results from a deviation of its reflectance spectrum from an ideal reflector (100% at all wavelengths). The reflection spectra of several typical papers are shown in FIG. 5. It is evident that these deviations happen mostly in the blue side of the spectrum and that the deviations manifest themselves by a higher or lower reflection with respect to the rest of the spectrum. The typical average deviation can reach up to 10%. Higher blue reflection results in a bluish tint, while lower reflection in a yellowish tint. To simulate the bluish tint, a short-wavelength cut-off filter with a continuously varying density (along the filter x-direction) from zero (spectrally flat filter) to 0.1 (about 80% transparency) may optionally be used. Other filters, with other spectra, may be used.

Figure 6A:
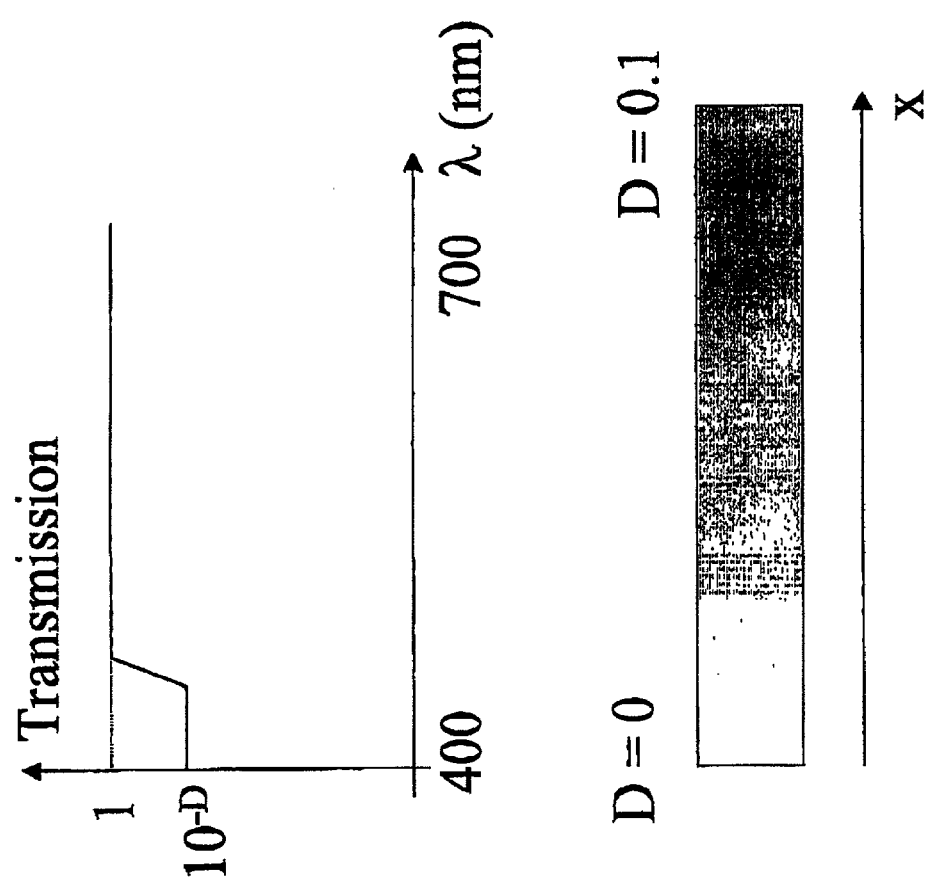
FIGS. 6A and 6B show suggested designs for the spectrum correcting filter according to an embodiment of the present invention.
Figure 6B:
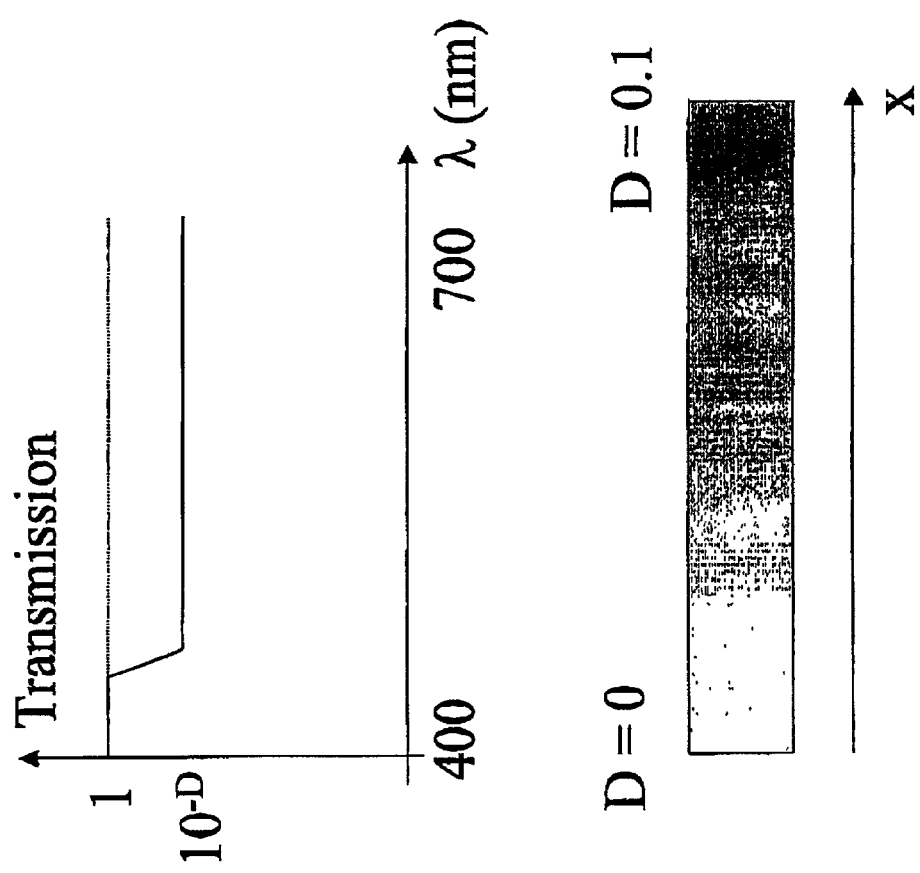

A spectrum of spectrum correcting filter 22 according to one embodiment for correcting for paper reflection and construction thereof are shown in FIG. 6A. The yellowish tint may be obtained with, for example, a long-wavelength cut-off filter with density in the range of 0-0.1, shown in FIG. 6B. The light is impinging on a relatively small area of the filter. The blue part of the spectrum is enhanced or reduced according to the relative density in the blue part of the spectrum with respect to the rest of the spectrum at the position of incidence. The color of the transmitted light is adjusted by shifting the placement of the filter along the x-direction, and thereby changing the relative density of the filter which filters the light, until the white area on the screen has the same color as that of the paper. Other spectrum correcting filters or methods may be used. Such filters or methods may be operator selectable or adjustable to enable correction for multiple light sources or papers.

In one embodiment, transmission spectrum of color filters 52, of which there are preferably at least seven, is preferably very close to that of a set of standard inks (and overlaps), used in the relevant printing facility. Optionally, colored filters 52 are implemented as seven color filters 52 are C(yan), M(agenta), Y(ellow), R(ed), G(reen), B(blue) and white. Other numbers of color filters and other spectra may be used. Other embodiments may use combinations of primaries to reproduce such transmission spectra.

Preferably, the transmission of the white filter of color filters 52 is close to 100% and to be almost independent on wavelength in the visible range of the spectrum. The white light is optionally implemented as an anti-reflection coated glass filter with suitable transmission properties. In alternate embodiments the production of the white light may be different, and may use other spectra.

Figure 4:
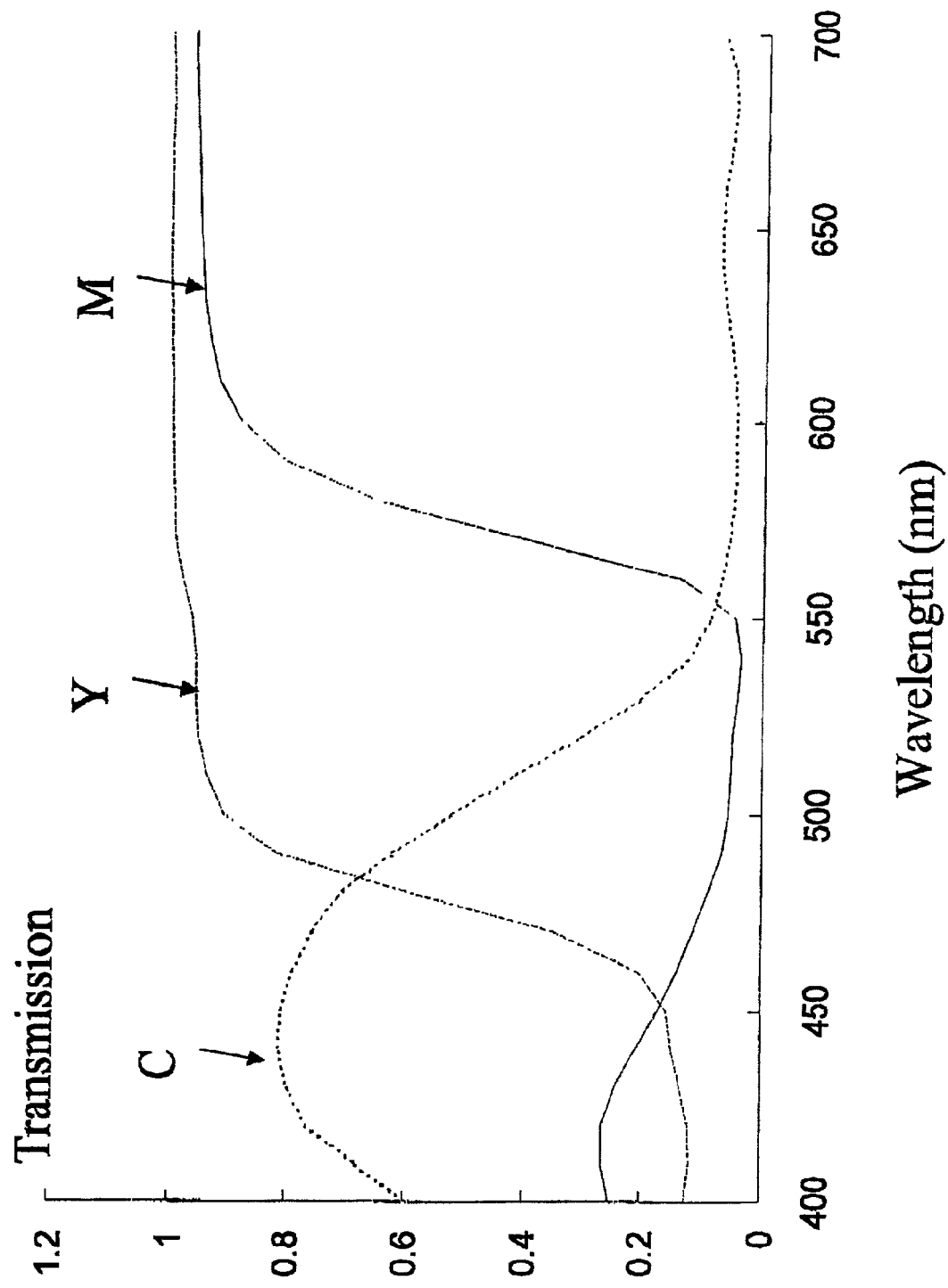
FIGS. 4A and 4B show transmission spectra for exemplary sets of color filters according to an embodiment of the present invention.

In one embodiment, the transmission of the filters 52 is close to that of typical process inks (and resulting overlaps) used in the print material to be reproduced. Thus the filters and primaries used depend on the set of inks to be reproduced; different inks may result in different sets of filters and primaries. The transmission spectrum of one set of C M Y process inks and of R G B overlap colors is shown in FIGS. 4A and 4B. Such filters 52 can alternatively and optionally be realized as gelatin filters with the same or similar pigments as used for the inks or even alternatively and optionally as interference filters. Another possibility is to use inkjet printers or offset machines, with special inks such as UV inks for example, that can adhere to glass or transparent plastics, to print colored filters 52. In alternate embodiments other filters or forms of filters may be used.

Figure 10A:
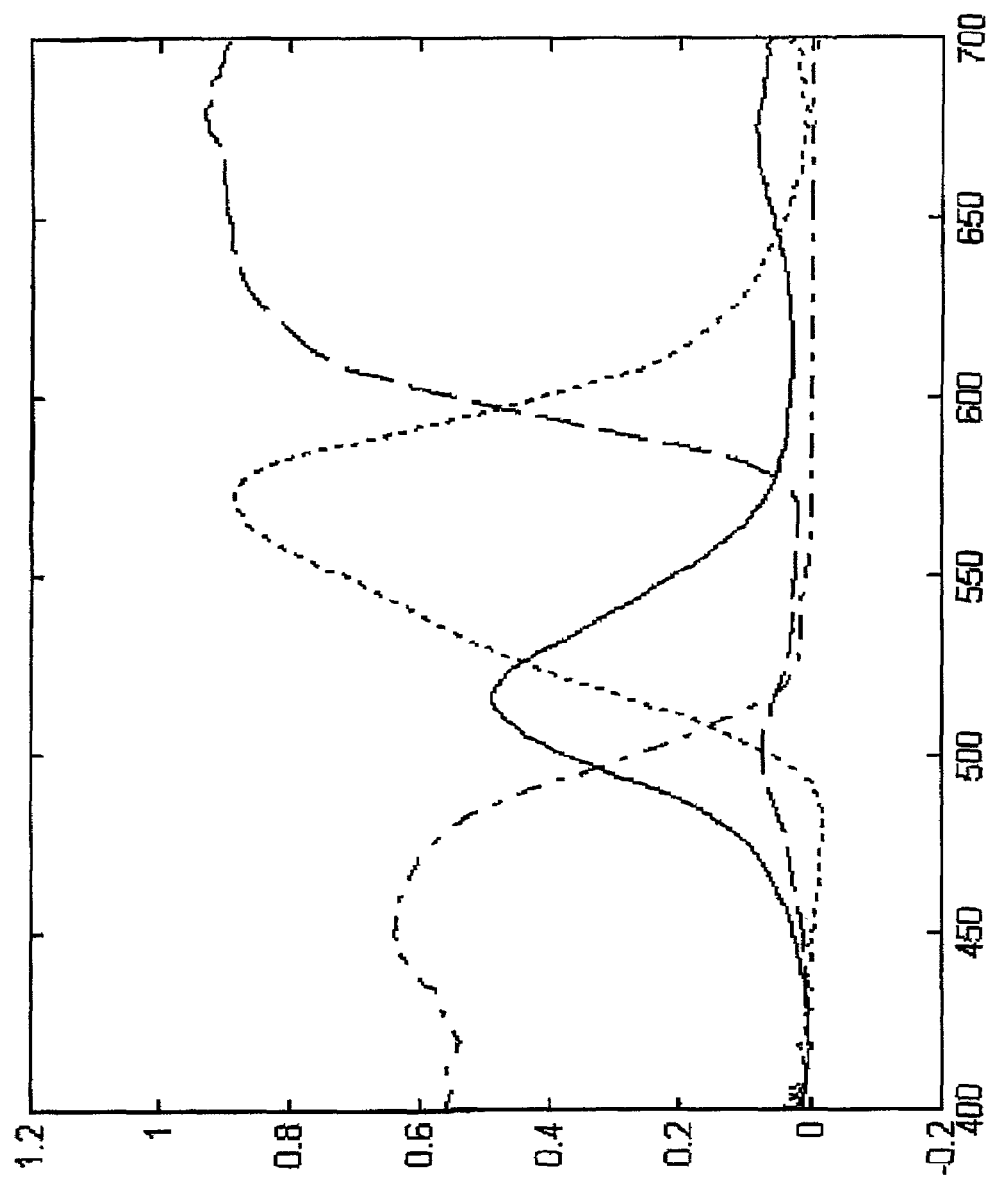
FIG. 10A depicts a set of four transmission spectra which may be used to reproduce a set of ink transmission spectra by linear positive combinations. according to an embodiment of the present invention.

In an embodiment where six filters or primaries are used, transmission spectra produced by light passing through combinations of cyan, magenta, yellow, red, green and blue ink may be included, and a white spectrum may be produced by a linear combination of these spectra. Alternately, other linear combinations of primaries or filters may be used to produce required ink transmission spectra. Furthermore, other numbers of primaries may be combined to produce a white color. FIG. 10A depicts a set of four transmission spectra which may be used to reproduce a set of seven ink transmission spectra by linear positive combinations. For example, the four filter curves may be derived as:

$$f1(\lambda)=C(\lambda)-G(\lambda)$$

$$f2(\lambda)=G(\lambda)$$

$$f3(\lambda)=R(\lambda)$$

$$f4(\lambda)=Y(\lambda)-G(\lambda)-R(\lambda)$$

Figure 10B:
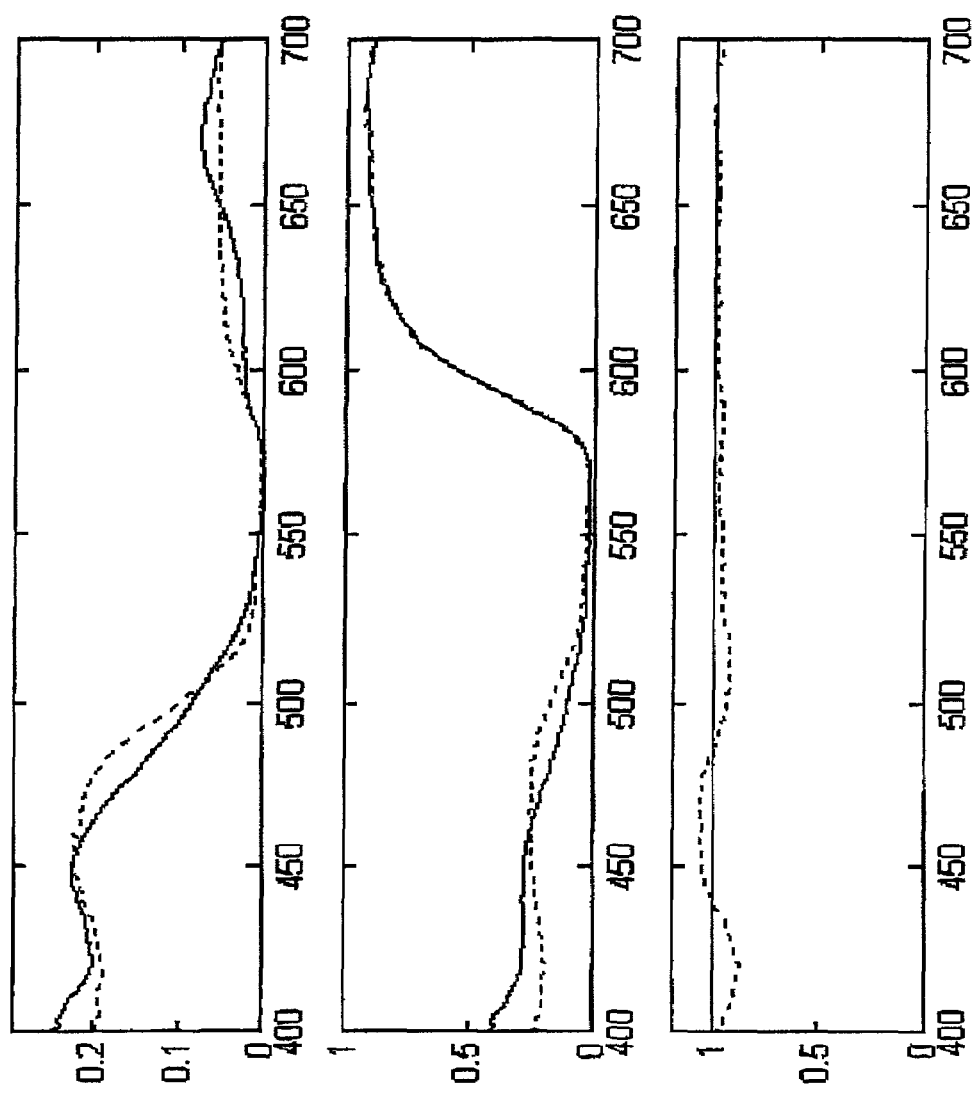
FIG. 10B depicts a set of target spectra and their reproductions, according to an embodiment of the present invention.

Other curves may be used. The C, G, R, Y may be trivially derived from f1-f4. FIG. 10B depicts how the three spectra M, B and W may be spectrally reproduced from the filter curves shown in FIG. 10A. Referring to FIG. 10B, the dotted lines represent the reproduced spectrum, and the solid lines the ideal or target spectra. The $B(\lambda)$ and $M(\lambda)$ and $W(\lambda)$ can therefore also be spectrally reproduced, in addition to the $C(\lambda)$, $G(\lambda)$, $R(\lambda)$ and $Y(\lambda)$, from f1-f4, above. In alternate embodiments, other methods may be used to reproduce a larger number of spectra from a set of primaries.

Figure 8A:
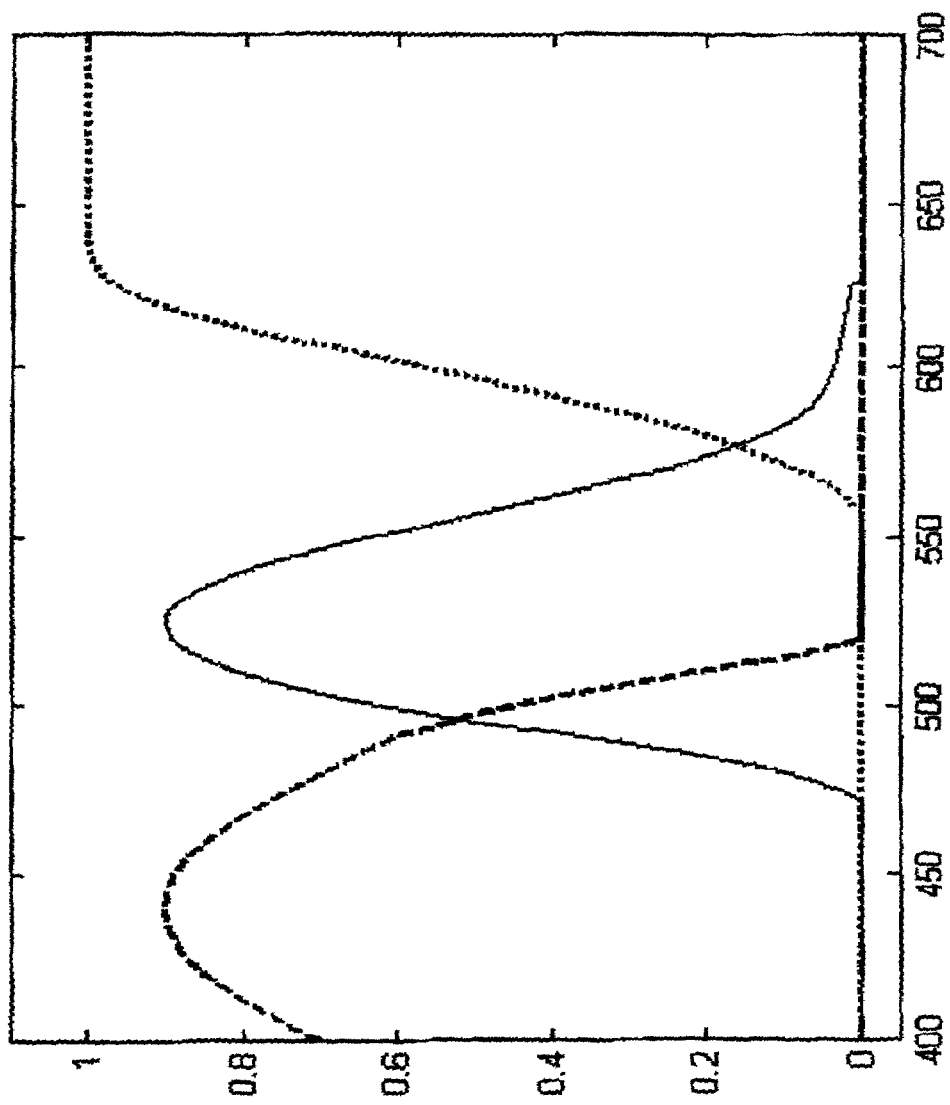
FIG. 8A depicts a set of filters which may be used to reproduce a set of transmission spectra, according to an embodiment of the present invention.
Figure 8:
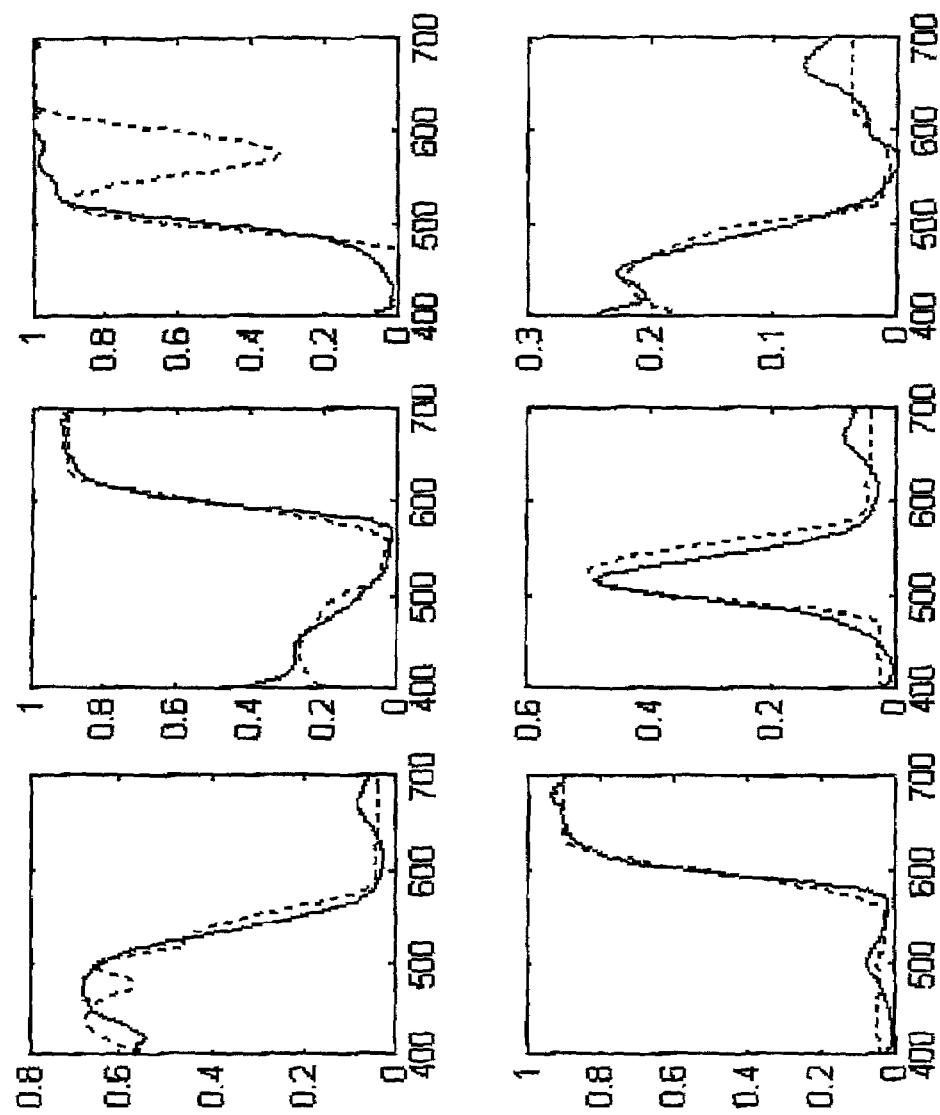
FIG. 8B depicts a comparison of a reproduction of a set of transmission spectra and the set of transmission spectra, according to an embodiment of the present invention.

FIG. 8A depicts a set of filters that may be used to reproduce a set of transmission spectra, according to an embodiment of the present invention. FIG. 8B depicts a comparison of a reproduction of a set of transmission spectra and the set of transmission spectra, according to an embodiment of the present invention. In certain embodiments, a certain number of filters may be used to reproduce a larger number of spectra. For example, with less than seven filters (e.g., three filters with transmission spectra similar to those shown in FIG. 8A) the spectra of seven colors can be reproduced or approximated, as shown in FIG. 8B, although possibly with a lower accuracy.

In alternate embodiments, the filters used to correct the spectra may be adjustable, selectable or replaceable by the operator to enable proofing for different ink systems.

An embodiment using liquid crystal modulators uses polarized light, which is the preferred embodiment for FIG. 2. For reflecting devices, such as Liquid Crystal Over Silicon (LCOS) devices, the same polarizer, usually a polarizing cube beam splitter, can be used for polarizing the incident light and for analyzing the reflected light. The exemplary but preferred implementation shown in FIG. 2 is based on a reflecting LCOS device for spatially modulated mask 26, and therefore a polarizing cube beam splitter 25 may be included in system 48, from which polarized light 27 is transmitted to projection lens 28. It should be noted that this is for the purposes of illustration only, and other implementations of system 48 are also possible as based on other modulators, such as those devices which are described as examples of other such spatial modulation devices.

An exemplary description of the flow of data and data handling is also shown with regard to FIG. 2B. The data is optionally given as a digital CMYK image file 201 as shown; other input data formats may be used. The data optionally and typically arrives in a raster format, particularly for display systems associated with computers. The raster format may be, for example, a signal presenting the C, M, Y and K values pixel-by-pixel, line-by-line for an image. In this process, the data system evaluates the spectrum obtained from the inked paper for a certain CMYK combination, and the linear combinations of the display filters that reproduce this spectrum are found and presented by the optical engine on the viewing screen. Preferably, the transition is not done through the spectrum, but instead printer models such as, for example, Murray-Davis-Neugebauer or Celluar Neugebauer are applied in combination with a transformation matrix from the Neugebauer spectral primaries to the spectral filters to obtain directly the resulting values to form the CMYK data.

In one embodiment, the data system transforms the input data, for example CMYK data, into a value representing the amount of light passing through each of the color filters or other data for each of the pixels. Other transforms and methods of transformation may be used.

Preferably, the data system rearranges the resulting data in a format consistent with the physical SLM (spatially modulated mask 26), and loads the data into spatially modulated mask 26 at the required timing for producing each color in a sequential (time-based) projection system. In other embodiments, the data system may perform other functionality, and the functionality may be performed by other systems.

In the case of CMYK input data, referring to FIG. 2B, the input CMYK image file 201 contains the data of the four-color separations. Each of the color separations of the CMYK file may be processed by a one-dimensional look-up table (1-D-LUT) 202, to correct for the dot gain print effect of the printing process. In alternate embodiments, dot gain correction need not be performed or may be performed in other manners. The resulting CMYK channels are transformed by a transformation module 203 into multi-primary data, such as RGB CMY white data, as described below. The color channels may pass through a print effect simulation module 204 described below. If the primaries of the display do not match the spectra of the print inks, the data may be converted by a conversion unit. The print primary data is converted to data representing the proportions of the display primaries used to display the print data. For example, RGB CMY white data may be converted to display primaries values. If the display primaries are identical to the ink spectra used, conversion may not be required. The data may be processed by a gamma correction module 205, to aid in producing a linear response by spatially modulated mask 26. The data channels are formatted and loaded through frame buffer and formatter 206 one after the other into spatially modulated mask 26. In alternate embodiments other methods of converting data may be used.

In one embodiment, the 1-D-LUT transformations 202 correct for printing dot gain effects. The value C (or M, Y, K) of a certain pixel in the file, represents the cyan-covered area of the relevant printing dot on the paper. However, if a plate is prepared with the value written in the file, the amount of ink which is printed on the paper is usually larger than the sizes of that portion in the file. This is a dot gain effect, which results from the spreading of the ink during the print. Some dot gain is beneficial in printing, and as a result a printed sheet has an apparent density which is slightly higher than that written in terms of dot % values in the file. Since the display of the image on the display screen is supposed to mimic the paper, the dot gain values preferably should be determined in order to correct the file values for dot gain. This correction may be performed with a one-dimensional function for each of the inks, namely:

$$\% \, dot_i \, on \, paper = f_i \, (dot \, \%_i \, in \, file)$$

where i=C, M, Y and K. The 4 one-dimensional functions are implemented by 4 one-dimensional lookup tables (1-D-LUT), which contain the output value for a dense set of input values.

The corrected C, M, Y, K dot % values are determined and passed through a 4→7 transformation by the module 203 to obtain the C M Y R G B W (hite) values, for example using the Demichel equations (other transformations may be used):

$$F_C = C \text{ only} = C(1-M)(1-Y)(1-K)$$

$$F_M = M \text{ only} = M(1-C)(1-Y)(1-K)$$

$$F_Y = Y \text{ only} = Y(1-C)(1-M)(1-K)$$

$$F_R = R \text{ only} = MY(1-C)(1-K)$$

$$F_G = G \text{ only} = CY(1-M)(1-K)$$

$$F_B = R \text{ only} = CM(1-Y)(1-K)$$

$$F_K = K \text{ only} = K + CMY(1-K)$$

$$F_W = 1 - \Sigma_{i \neq W} F_i$$

Here C, M, Y and K are the respective dot areas of the relevant pixel. Preferably, the spectra produced by the black ink used in the printing process does not differ from that produced by an overlap of the C, M and Y inks; however, implementations where the spectra differ, where the blacks differ, are also possible. In such implementations, more Neugebauer values and primaries may be used to represent the blacks. Other methods of converting input data to spectra may be used, and input data based on other ink systems may be used.

The implementation of the Demichel transformations can be done in software or hardware. Demichel Equations are described in various articles and references (see for example "A Critical Review of Spectral Models Applied to Binary Color Printing", by Wyble and Berns, *Color Research and Application*, vol. 25, 2000, pages 4-19). Assume that there is a printing dot for which the values of the different inks are given by C, M, Y and K (C,M,Y,K <1). This implies that a portion C of the printing dot is covered by Cyan, a portion M by Magenta and so on. Therefore, (1−C) of the dot area is not covered by Cyan, 1−M is not covered by Magenta, and so forth. To determine the area which is covered by Cyan only, the equation Fc=C (1−M) (1−Y) (1−K) is obtained. This is the logic of Demichel equations as described in the above-referenced article (further assuming that CMY overlap is equal to black).

Neugebauer has point out that a close spectral match is obtained by the following formulae:

$$R(\lambda) = \sum_i F_i R_i(\lambda)$$

where $R_i(\lambda)$ are the spectral reflectivity of the elementary colors i=RGB CMY K, W, and $F_i$ are relative proportions of the elementary colors defined above using Demichel equations. $R_i(\lambda)$ depends on the illumination conditions via $R_i(\lambda)=S(\lambda)R_W(\lambda) T_i(\lambda)$, where $S(\lambda)$ is the spectrum of the incident light, $R_W(\lambda)$ is the reflectance of the white paper and $T_i(\lambda)$ is the transmission of the $i^{th}$ elementary color (ink or overlap of inks). It is usually assumed that the transmission of black layer $T_K(\lambda)$ is zero or negligible over the whole spectral range, however, correction for finite small transmission can also be implemented.

It should be noted that the system described above, with the adjusted white spectrum and color films, with the same transmission spectrum as that of inks, and using the Demichel equations to predict the "gray level" or gradation of each color, is a physical manifestation of the Neugebauer equation. It should also be noted that the system can be applied to other spectral models, which are discussed in the article cited above.

The resulting color data is then optionally processed by a print effect simulation module 204, which is further described below. Conversion of these seven (or more) Neugebauer coefficients to display primaries values is preferably performed. If less than seven primaries are used (e.g., three to six primaries) the intermediate data (e.g., RGB CMY White data) is transformed into the relevant data for these primaries. In one embodiment, the data is transformed using a transformation matrix. In alternate embodiments, other transformation methods may be used. Furthermore, in alternate embodiments a set of X primaries each not matching any of a set of X transmission spectra may be combined to substantially reproduce those X spectra.

The intermediate data such as the CMY RGB W data may be represented by $$\varphi_j(\lambda) = \sum_{i=1}^{N} a_{ji} f_i(\lambda),$$

where $\phi_j(\lambda)$ are the spectra of the Neugebauer primaries (for example, j=CMYRGBW) and $f_i(\lambda)$ for i=1 . . . N, are the filter spectra. After calculating the primary (e.g., c, m, y, r, g, b, w) values for a certain pixel the values for each of the primary filters $p_1$ . . . $p_N$ may be given by the following matrix transformation:

$$\begin{pmatrix} p_1 \\ \vdots \\ p_j \\ \cdot \\ p_N \end{pmatrix} = \begin{pmatrix} a_{c1} & a_{m1} & a_{y1} & a_{r1} & a_{g1} & a_{b1} & a_{w1} \\ \vdots & \vdots & \vdots & \vdots & \vdots & \vdots & \vdots \\ a_{cj} & a_{mj} & a_{yj} & a_{rj} & a_{gj} & a_{bj} & a_{wj} \\ \cdot & \cdot & \cdot & \cdot & \cdot & \cdot & \cdot \\ a_{cN} & a_{mN} & a_{yN} & a_{rN} & a_{gN} & a_{bN} & a_{wN} \end{pmatrix} \begin{pmatrix} c \\ m \\ y \\ r \\ g \\ b \\ w \end{pmatrix}$$

In general the transformation matrix is an N×7 matrix, where N is the number of display filters and 7 is the number of Neugebauer primaries in the intermediate data (other numbers of primaries may be used). If more than seven Neugebauer primaries are included in the calculation, for example L Neugebauer primaries, an N×L matrix is required. For example, in addition to the c m y r g b and white, additional (e.g., nine) tints of black may also be included, and if a cellular Neugebauer algorithm is applied the number of points may increase accordingly.

Then, the N-primary color channels are preferably subjected to a gamma correction process for the response of spatially modulated mask 26 by an optional gamma correction module 205. The gamma-correction module 205 performs a non-linear transformation for each of the data channels, in order to correct for non-linear properties of the physical device, in such a way that ultimately the combined response of the data and the physical device is linear. Namely, if by loading a value R directly to the physical display, a brightness f(R) is obtained which is not linear on R, the gamma-correction is a one-dimensional transformation for the R channel that has the response $g(R)=f^{-1}(R)$. The data R is transformed to g(R) and then the response of the physical device is f(g(R))=R, which is therefore linear on R. Preferably, this transformation is performed by applying several look-up tables (one or more for each channel), which contain the output values corresponding to all possible input values. The use of such look-up tables provides for a standardized, corrected, linear output which can be more precisely displayed with an embodiment of the system of the present invention. In alternate embodiments other gamma correction methods may be used.

In alternate embodiments, other sets of steps may be used to process input data.

The data is transferred to the display mechanism. While in one embodiment the display mechanism relies on projected light, in alternate embodiments methods such as LCDs or LEDs may be used. In an exemplary embodiment, the data is transferred to the frame buffer and formatter 206, which arranges the data in a format acceptable by spatially modulated mask 26, and provides the correct electronic and physical interface to spatially modulated mask 26. Frame buffer and formatter 206 also arranges the stream of data in a format consistent with the electronic requirements of spatially modulated mask 26. Preferably, frame buffer and formatter 206 is a memory device for holding the data of the image. Typically, the data is held in the same geometrical arrangement as the pixels of the image, and of spatially modulated mask 26.

For the system described above, the frame buffer itself, of frame buffer and formatter 206, is preferably divided into bit planes. Each bit plane is a planar array of bits, in which each bit corresponds to one pixel on spatially modulated mask 26. Each bit plane actually represents at least a part of the data for each color, such that if a pixel is to have a component which includes a particular primary color, that pixel is represented by a particular bit on the appropriate bit plane which features that primary color. The bit planes are arranged one below the other to form a three-dimensional arrangement of the data, from the most significant to the least significant bit. There are m×N bit planes (m is the number of bits/color channel, N is the number of color channels).

The data which is sent to spatially modulated mask 26 represents a "gray level" of each of the colors, and may be presented as, for example, 8 bits (256 levels) per each primary. The various "gray levels" of the illumination can be achieved in different ways depending on the type of spatially modulated mask 26 which is used. For "analog" modulators, such as nematic LC modulators for example, the gray level is determined by the amount of the optical axis rotation, controlled by the voltage applied to the device. Each frame may require a set of "updates", or changes to the configuration, of spatially modulated mask 26, with one update for each of the primary colors of color filters 52. For a frame refresh rate of 50 Hz for viewing screen 29, and for seven primaries, this corresponds to an update rate of 350 Hz. Other update rates may be used. The eight bit planes corresponding to the relevant color are retrieved from the frame buffer itself, of frame buffer and formatter 206, and are optionally and preferably transformed into analog signals. These analog signals are then amplified and applied to spatially modulated mask 26. Other methods of projecting the primaries may be used.

For the "binary" type of spatially modulated mask 26, such as digital micro-mirror devices (DMD) by Texas Instruments or Ferroelectric Liquid Crystal (FLC) SLM by MicroPix, Displaytech and other vendors, gray levels are achieved by pulse width modulation (PWM) of the light, a technique which is well known in the art. In order to perform pulse width modulation of the light, m bit planes, shown here for m=8 planes, for each primary color are loaded into spatially modulated mask 26 during the period for displaying the relevant color. For a frame rate of 50 Hz and a seven color filter display, the time for each color to be displayed is 20 ms /7=2.85 ms (20 ms=1/50 Hz). During this time, 8 bit planes are loaded into spatially modulated mask 26, resulting in an update rate of 2.8 kHz. However, if PWM is applied to the light, the least significant bit plane is preferably presented on spatially modulated mask 26 for only 11.2 microseconds.

To extend the display period and therefore to avoid such a rapid refresh or change rate for spatially modulated mask 26, optionally and preferably PWM is not applied to the light. Instead the illumination time is preferably divided uniformly between the bit planes. The different bit values are then optionally and more preferably created by changing the brightness of light incident on spatially modulated mask 26. The brightness of the incident light is optionally and most preferably altered by using a continuously varying neutral density (ND) filter, as described in greater detail below.

The loading of the data into spatially modulated mask 26 is preferably synchronized by a timing and control system 207, according to the rotation of color filter wheel 24.

In alternate embodiments, other methods of displaying the set of primaries may be used.

An embodiment of the system of the present invention is capable of projecting images, determined by the data, of different colors onto a viewing screen. The preferably temporal integration of the different frames of different colors creates the sensation of the required color. The illumination conditions may be replicated by adjusting the white light color and brightness to that reflected from the paper, using the spectrum correcting filter and power supply 23. By choosing the transmission spectra of the colored filters 52 to be substantially identical or identical to that of light passing through the inks and the overlaps, or by choosing the transmission spectra so that the spectra of light passing through the inks may be reproduced by linear combinations of the filter spectra, a match or substantial match between the behavior of inks on paper and the display may be achieved, as implied by Neugebauer equation. The creation of a complex color sensation, by spatial integration of ink dots of different elementary colors, is replaced by temporal integration of images of the same elementary colors. The color sensation in this method is substantially identical or identical, in principal, to the way it is achieved in printing, and thus good color match and control over varying conditions is easier to achieve.

In alternate embodiments, non temporal methods may be used to display the primaries. For example, another embodiment is based on integrating all elementary colors simultaneously. This is preferably performed by separating the white light after being spectrally adjusted to obtain the correct white spectrum, into a set of primary channels. Each channel is filtered by one of the primary filters (e.g., C M Y R G B and white filters), and spatially modulated by its spatial light modulator according to the data. Then all channels are combined using an appropriate optical system to give a full color image on the screen.

According to preferred embodiments of the present invention, there is described a method for simulating print effects, such as ink trapping, dot gain, lower ink densities, gloss, and other effects, for example, by using the system and device of embodiments of the present invention. These effects are preferably simulated using the print effect simulation module 204 in the data system.

Trapping may be associated with the difference between ink adhesion on paper and adhesion of ink on ink (see FIG. 3). This may be important for the overlap RGB colors. If perfect trapping occurs the thickness of the overlapping layer 31 is the same as the thickness of the same ink layer on paper (FIG. 3A). However, in many cases, an ink layer 41, which is impressed on top of another ink layer 42, is thinner than that printed directly on paper (see FIG. 3C). In FIG. 3A white light (30) passes through a perfectly trapped layer of yellow ink (31) and a layer of magenta ink (32), incident on the paper (33), and reflected back through the same layers to give red light (34); FIG. 3B shows ideal transmission spectra of the yellow (61) and the magenta (62) inks, together with the spectrum of the red light (64) going through these layers. In FIG. 3C, non-ideal trapping is shown, in which the yellow ink layer (41) is thinner than that in the case of perfect trapping (31). In FIG. 3D the transmission spectrum of the poorly trapped yellow layer (71) and the magenta layer is shown together with the spectrum of the light (44) going through these layers, in addition to the red portion of the spectrum (75) additional blue component (76) is also present. The ratio between the thickness of the overlap layer and that of the same ink printed directly on paper is a measure of trapping. Usually, this value is about 75%, however it may vary depending on paper type and the set of inks used. This variation results in a change in the color perception of the overlapping elementary colors RGB.

To explain the ink trapping simulation, an idealized situation is assumed, where there is no overlap between the spectral regions corresponding to RGB (see FIG. 1). Each one of the CMY inks blocks one of the RGB components of light to large extent, and transmits the other components perfectly. For perfect trapping, the overlap of two inks, such as M(agenta) 32 and Y(ellow) 31, for example, results in a red color 64 plus some minor residues of green and blue. This small amount of green and blue are due to the imperfect blocking of the M and Y inks (which transfer some G(reen) and B(lue) respectively). If the trapping is not perfect, the thickness of the yellow ink layer 41 on top of the magenta layer 42 is smaller. The amount of the red (and green) spectral components 75 of the reflected light 44 does not change, but more of the blue component 76 is transferred, due to the reduced blocking of the yellow layer 41.

In a typical printing offset, the ink sequence is KCMY, namely C(yan) is printed before M, which is printed before Y. Under these conditions, B may be added to correct for imperfect trapping of R (MY) and G (CY), and G may be added to correct for B (CM).

For example, the amount of blue passing through the blue-blocking Y ink is given by $10^{-D_Y}$, where $D_Y$ is the density of the yellow inic When the trapping is not perfect, the amount of blue light transferred is $10^{-D_Y \cdot t}$ (t is the trapping ratio). Assuming that the magenta is completely transparent to blue, the amount of blue that may be added is $\alpha_B = 10^{-D_Y \cdot t} - 10^{-D_Y}$. Thus, the blue signal sent to the SLM is given by $B'(i,j) = B(i,j) + \alpha_B[R(i,j) + G(i,j)]$, where i and j are pixel coordinates, and B, R and G are the original signals calculated from the Demichel equations. In a similar manner, the green signal is corrected by the additional amount contributed by the imperfect trapping of B (CM). It should be noted that although the magenta is assumed to be completely transparent to blue, this is not a prerequisite, and the correction can use a similar procedure by including the effect of the blue absorption in the magenta layer. Other methods for adjusting the primary signals, and other adjustments, may be used.

In the non-ideal case, the blue which is created by transferring white light through the blue filter (which mimics light transfer through cyan and magenta ink layers) does not have the same spectrum as the light rejected by the yellow filter. Nevertheless, it is a very good approximation. To obtain the correct spectrum other elementary colors can be added to the blue filter color, so that the resulting spectrum is similar to the required one.

When the density of the ink in the relevant printing press is lower than that of the corresponding filter in the projection system the color on the paper appears less saturated than on the projected image. In this case $D_S < D_F$, where $D_S$ is the ink density and $D_F$ is the filter density. This effect is corrected by mixing some white light with the colored light. The amount of white light to be added is calculated by the Murray-Davis formula given above (or by the more sophisticated Yule-Nielsen formula), where the ink density is taken as tint density and the filter density as the solid density, giving a correction factor of:

$$\alpha_S = \frac{1 - 10^{-D_S}}{1 - 10^{-D_F}}$$

For halftone areas the same correction applies. Thus, the cyan signal sent to the SLM is given by $C'(i, j) = \alpha_S C(i, j)$, and the white signal is given by $W'(i,j) = W(i,j) + (1-\alpha_S)C(i,j)$ where i and j are pixel coordinates, and C and W are the original signals calculated from the Demichel equations. For the trapping colors R, G, B the ink densities are taken as (for KCMY printing sequence):

$$D_R = D_M + t_R \cdot D_Y$$

$$D_G = D_C + t_G \cdot D_Y$$

$$D_B = D_C + t_B \cdot D_M$$

and the same calculation applies. Here, $t_R$, $t_G$ and $t_B$ are the trapping parameters for the R, G, B overlaps respectively. Both the trapping and the density corrections may result in the change of the print primaries (Neugebauer primaries) from their nominal values. This change is similar to that which occurs between the Neugebauer primaries and the display filters; this may be processed within the conversion matrix or by other methods. The transition from $C(i,j) \rightarrow C'(i,j)$ and $W(i,j) \rightarrow W'(i,j)$ discussed above with relation to change of density, and similar relations discussed in the trapping case may be considered linear combination of primaries that can be handled by matrix manipulations. Other correction methods may be used.

Pictorial images may be printed with high gloss. The gloss is the property of the surface for reflecting the light specularly (mirror-like reflection). When light is incident on an inked paper part of it (often about 4%) is reflected without penetrating into the ink. This light is reflected specularly and diffusively. The diffusively reflected light arrives to the eye and gives the impression of color, while the specular reflection is very directional and will not be observed. Since the light is reflected from the surface without penetrating the ink, it has the same spectral properties as that of the incident light and is not affected by the surface color. Thus, the observed color is a mixture of the color of the ink and the white light, which is reflected from the surface diffusively.

This effect reduces the saturation of the color (and its apparent density). If the surface has a high gloss the fraction of the non-penetrating light reflected specularly is larger, and the amount reflected diffusively is lower. Thus, for high gloss surface, the disturbing effect of the diffusely reflected non-penetrating light is smaller, and the colors appear more saturated. Indeed, the apparent density of inks on a matte paper is lower than that on glossy papers.

The correction for gloss is preferably performed via measurement of the densities of inks on the relevant paper and correcting the density as mentioned above. Another possibility is to use the measurement the ink densities on a reference paper and the gloss of the sample paper, and to calculate the change of the apparent density of the inks. In addition, it is possible to include a beam splitter in the white light path, which samples an amount of light equal to the non-penetrating diffusely reflected portion, and direct this part of the light onto the viewing screen.

When using the soft proofing device and system of certain embodiments of the present invention, the operator preferably starts by adjusting the white point. The operator may compare the relevant paper under the required illumination conditions, and may adjust the brightness of the light source via the power supply, and the tint of the paper using the paper correcting filter, until a match between paper and screen is achieved. Then the dot gain curves of the printing machine and the densities and trapping values of the inks are loaded, to allow for the correction of the data file values.

Variable Neutral Density (ND) Filter For Increasing Bit-Depth in PWM

A neutral density filter can optionally be used to increase the bit-depth in the PWM. For example, a varying neutral density filter could optionally be placed after the color filter wheel. This ND filter wheel rotates synchronously with the color filter wheel, so that the ND filter wheel completes, for example, seven turns during one turn of the color wheel.

Figure 7A:
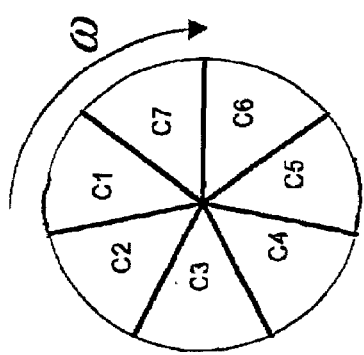
FIGS. 7A-7C illustrate an implementation of an embodiment of the present invention with an exemplary neutral density (ND) filter, with an illustrative implementation for the filter arrangement of the color wheel with such an ND filter (FIG. 7A), the timing sequence for operation of the color filter wheel (FIG. 7B), and a graph of the density of the ND filter (FIG. 7C).

FIG. 7A shows an illustrative implementation for the filter arrangement of the color wheel with such an ND filter 52. The color filter wheel is divided into several color sections, labeled as "C1" to "C7" respectively, the width of each is $2\pi/N$ radians, where N is the number of primary colors. Other numbers of sections may be used. As described in greater detail below, each color section is a different color filter, which preferably has a separate ND filter. The ND filter does not affect the spectral content of the filtered light, but rather alters the intensity of the filtered light over the entire spectrum.

Figure 7B:
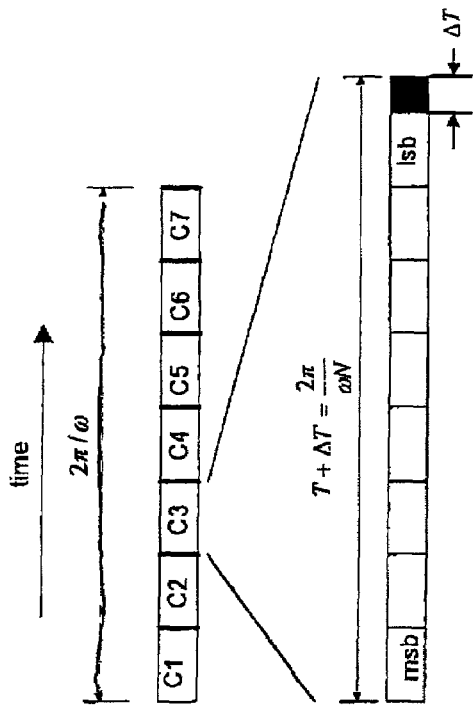
Figure 7C:
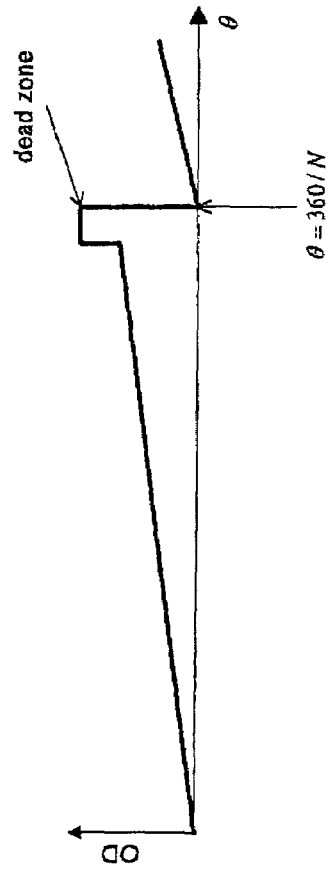

The timing sequence for operation of color filter wheel 52 is depicted in FIG. 7B. The duration of a full rotation of the color filter wheel is $2\pi/\omega$, each color section has a? time slot of $2\pi/\omega N$, during which m bit planes are loaded into the spatially modulated mask. Each bit plane occupies equal time duration and at after the last significant bit loading, a dead zone exists. To achieve the correct dependence between light intensity and the corresponding bit value, a continuously varying ND filter is placed in each color section of filter 52. The density of the ND filter varies linearly θ from zero density to a density of $m \cdot \log_{10} 2 \approx 0.3m$, m being the number of bits/channel, as shown in FIG. 7C. In the transition region (the dead zone), from the least significant bit (lsb) of one color to the most significant bit (msb) of the next color the density increases to a higher value to avoid color mixing. As shown below, this design helps to ensure that the brightness of light deflected from i-bit plane has, in one embodiment, an almost linear dependence on the value of $i^{th}$ bit. A gamma-correction look-up table (LUT) compensates the remaining non-linearity as explained above. Other methods of using a neutral density filter may be used.

The light intensity which passes through the ND filter, during the period of the $i^{th}$ bit (msb=0 bit, lsb=m−1 bit) may be given by:

$$\frac{I_{AVG}(i)}{I_0} = \frac{1}{T + \Delta T} \int_{\frac{iT}{m}}^{(i+1)\frac{T}{m}} 10^{\frac{0.3mi}{T}} dt =$$

$$\frac{T}{0.3m\ln 10(T + \Delta T)} 10^{-0.3i}(1 - 10^{-0.3}) = \frac{1/2}{m\ln 2(1 + \Delta T/T)} \frac{1}{2^i}$$

Here T+ΔT is the duration of color section, where ΔT is the time of the dead zone. It is evident that the ratio between the average intensities in two following bits is indeed 2. A similar relationship is also obtained when the ND filter has a density of 0.22 during the msb period, after which the density increases linearly from zero to 0.3 (m−1), while the timing sequence stays the same.

Display Mechanism

Various display mechanisms may be optionally used with embodiments of the present invention, which also affect the choice of light source and/or device for production of the primary colors. The preferred display mechanism is projection of light onto the viewing screen, for an optical projection system. In alternate embodiments, other methods of producing color primaries may be used. For example, the primaries may be produced by LCDs or LEDs. For example, a flat screen LCD producing a set of primaries able to reproduce transmission spectra of light passing through the inks may be provided. Such an LCD may have, for example, three to seven (or other numbers) of primaries, where the primaries are combined as discussed herein to simulate printed material.

Typical projection displays can work simultaneously, in which light of all colors illuminates the viewing screen at the same time; or sequentially, in which light of the different colors illuminates the screen one after another. For the latter type of display, the vision system of the human eye perceives combined colors through temporal integration, as the sequential display of colors is performed sufficiently rapidly.

The display systems are preferably based on spatially modulating colored light and projecting it on a display screen. The spatial modulation can optionally be performed by using a liquid crystal spatial modulator, in which case a source of polarized light may be used, or alternatively by a digital micro-mirror device (DMD) produced by Texas Instruments (USA) for example, which allows the use of non-polarized light. Of course other types of devices for performing spatial modulation are optionally used, and are encompassed by the scope of the present invention.

The spatial modulation can optionally be done with analog or binary levels or graduations, according to the type of modulator device which is used. Nematic liquid crystal modulators, for example by CRL Opto (United Kingdom), or Kopin Inc. (USA), allow for analog "gray levels", while Ferroelectric liquid crystal modulators, such as from Micropix Technologies (United Kingdom) or LightCaster™ from Displaytech (USA), and DMD are binary devices. If a binary modulator device is used for spatial modulation, "gray levels" are achieved by controlling the duration of the illumination, and/or the intensity of the light, incident on the spatial modulator.

The, SLM, or spatially modulated mask, is optionally either a binary modulation type or a continuous modulation type. Examples of the continuous modulation type include, but are not limited to, polarization rotation devices such as LCD (liquid crystal device), electro-optical modulator and magneto-optical modulator. In these devices, the polarization of the impinging light is rotated. In this context, LCD features an organized structure of anisotropic molecules, for which the axis of anisotropy is rotated by the application of voltage, thereby rotating the polarization. For the electro-optical modulator, isotropic crystals are featured, which change the rotation of the polarization of the light radiation, due to a change of the refractive index along the different axes, as a result of the applied voltage. The electro-optical modulator can be applied for a continuous, non-binary implementation or for a binary implementation. Magneto-optical modulators are devices in which a magnetic field is used to rotate the polarization, by changing the electro-optical properties of the crystal.

Examples of the binary modulation type include, but are not limited to, DMD, FLC, quantum well modulator and electro-optical modulator. DMD (digital micro-mirror device) is an array of mirrors, each of which has two positions, either reflecting light toward the viewing screen, or reflecting light away from viewing screen. FLC (ferroelectric liquid crystal) features liquid crystals, which have only two bi-stable orientation states, thereby changing the polarization of the light radiation to one of two states (effectively "on" and "off"). A quantum well modulator is a device in which voltage is applied in a quantum well, which then changes transmission and reflection properties for light by changing the states of the electrons in the well, to one of two levels according to the applied voltage. The electronic states are changed from being absorptive to being transmissive.

An implementation using liquid crystal modulators may require the use of polarized light. For reflecting devices, such as Liquid Crystal Over Silicon (LCOS) devices, the same polarizer, usually a polarizing cube beam splitter, can be used for polarizing the incident light and for analyzing the reflected light. For transmission devices, such as active matrix LCD based on thin-film-transistor technology (TFT) as provided by Epson, Kopin (USA) and other vendors, for which light passes through the pixilated matrix, linear polarizers are placed before and after spatially modulated mask.

Figure 11:
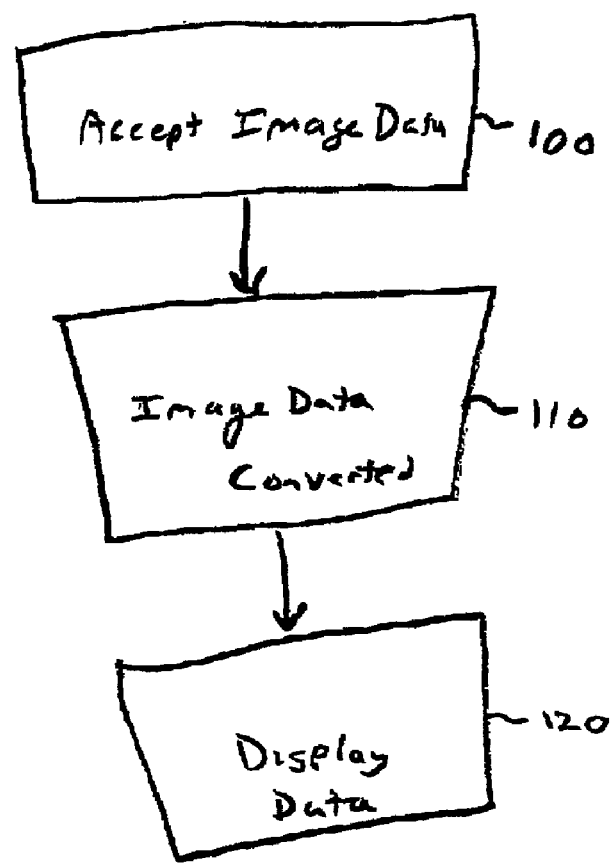
FIG. 11 depicts a series of steps for displaying an image of printed matter to be proofed according to an embodiment of the present invention.

FIG. 11 depicts a series of steps for displaying an image of printed matter to be proofed according to an embodiment of the present invention.

Referring to FIG. 11, in step 100, image data is accepted. In an exemplary embodiment, this image data is in a CMYK format, but may be in other formats.

In step 110, the image data is converted into a set of data corresponding to the primaries of the display. In an exemplary embodiment, this involves evaluating the spectrum obtained from the inked paper for a CMYK combination, and reproducing a set of linear combinations of the primaries that reproduce this spectrum. Corrections or modifications may be made to the resulting combinations. In alternate embodiments, the image data need not be converted, or may be converted using different methods.

In step 120, the resulting data is displayed by the monitor.

In alternate embodiments, other series of steps may be used.

While the invention has been described with respect to a limited number of embodiments, it will be appreciated that many variations, modifications and other applications of the invention may be made.

What is claimed is:

1. A device for soft proofing image data for printed material, the device comprising:
   (a) a light source and at least four color filters, wherein light passing through each of said color filters produces light having a different one of at least four primary colors, respectively;
   (b) a converter for converting the image data to a plurality of spectral components corresponding to said image data according to at least one characteristic of the printed material, said spectral components for use in producing converted data corresponding to at least one of said at least four primary colors;
   (c) a controller for determining an additive linear combination of said at least four primary colors according to said converted data for production by said light source; and
   (d) a viewing screen for displaying the image data according to said additive linear combination from said controller, wherein said at least four color filters are arranged between said light source and said viewing screen such that any light emitted by said light source passes through only a single one of said color filters before reaching the viewing screen.

2. The device of claim 1, further comprising:
   (e) a projector for projecting light of said at least four primary colors onto said viewing screen according to said determined additive linear combination.

3. The device of claim 1, wherein said light source comprises a polychromatic source, and wherein said at least four color filters arranged alongside one another in a direction transverse to light emitted by said light source.

4. The device of claim 1, wherein said projector comprises a spatial light modulator for determining a path of light of each primary color.

5. The device of claim 1, wherein said light source comprises a continuously variable neutral density litter for controlling brightness of said light of said at least four primary colors.

6. The device of claim 1, wherein said at least one characteristic of the printed material is determined according to a transmission spectrum of a combination of inks.

7. The device of claim 1, wherein said light source for producing light having at least four primary colors is selected such that a spectrum of said light having at least four primary colors is matched to at least a portion of a spectrum of a combination of inks.

8. The device of claim 1, wherein said at least one characteristic of the printed material is determined according to a color reflection characteristic of a material for receiving said combination of inks.

9. The device of claim 1, wherein said at least one characteristic of the printed material is determined according to a spectrum of a combination of inks, and wherein a brightness of said light having at least four primary colors is adjusted according to illumination conditions for said material for receiving said combination of inks.

10. The device of claim 1, further comprising a white light source for producing white light, wherein said illumination conditions are adjusted according to an amount of said white light being produced.

11. The device of claim 1, wherein said at least one characteristic of the printed material is also determined according to a spectrum of at least one ink, and said filtered light is adjusted according to a density of said at least one ink compared to said filters.

12. The device of claim 1, wherein a saturation of said light having at least four primary colors is adjusted according to a gloss of said material, said material for receiving at least one ink.

* * * * *